United States Patent
Kraft et al.

(10) Patent No.: US 8,604,442 B2
(45) Date of Patent: Dec. 10, 2013

(54) METHOD FOR DETERMINING THE MATERIAL COMPOSITION OF A MATERIAL SAMPLE

(75) Inventors: Gerhard Kraft, Darmstadt (DE); Wolfgang Enghardt, Radeberg (DE); Thomas Wuerschig, Dresden (DE)

(73) Assignee: GSI Helmholtzzentrum fuer Schwerionenforschung GmbH, Darmstadt (DE)

( * ) Notice: Subject to any disclaimer, the term of this patent is extended or adjusted under 35 U.S.C. 154(b) by 480 days.

(21) Appl. No.: 12/374,619

(22) PCT Filed: Jun. 18, 2007

(86) PCT No.: PCT/EP2007/056005
§ 371 (c)(1),
(2), (4) Date: Apr. 15, 2009

(87) PCT Pub. No.: WO2008/009526
PCT Pub. Date: Jan. 24, 2008

(65) Prior Publication Data
US 2009/0206269 A1   Aug. 20, 2009

(30) Foreign Application Priority Data
Jul. 20, 2006 (DE) .......... 10 2006 033 662

(51) Int. Cl.
*G01T 3/00* (2006.01)
*G01T 3/06* (2006.01)

(52) U.S. Cl.
USPC ............. 250/390.04; 250/370.05; 250/390.07

(58) Field of Classification Search
USPC ............. 250/370.01, 370.05, 370.09, 390.04, 250/390.07
See application file for complete search history.

(56) References Cited

U.S. PATENT DOCUMENTS

| | | | |
|---|---|---|---|
| 5,098,640 A * | 3/1992 | Gozani et al. | 376/166 |
| 5,109,227 A | 4/1992 | Godfrey | |
| 5,539,788 A * | 7/1996 | Ruddy et al. | 376/159 |
| 5,880,469 A * | 3/1999 | Miller | 250/367 |

(Continued)

FOREIGN PATENT DOCUMENTS

| | | |
|---|---|---|
| DE | 102 15 070 A1 | 10/2003 |
| DE | 103 30 595 A1 | 2/2005 |

(Continued)

OTHER PUBLICATIONS

International Search Report based on International Application No. PCT/EP2007/056005; Date of Mailing: Nov. 27, 2007.

(Continued)

*Primary Examiner* — Casey Bryant
(74) *Attorney, Agent, or Firm* — Leydig, Voit & Mayer, Ltd.

(57) ABSTRACT

A Method for determining the material composition of a material sample which emits radiation comprises the following method steps: recording a spectrum of the energy deposited in a detector material by the radiation; determining a first energy deposited in a first energy range, a second energy deposited in a second energy range, and a third energy deposited in a third energy range; assigning a first colour parameter to the first deposited energy, a second colour parameter to the second deposited energy, and a third colour parameter to the third deposited energy; and comparing the assigned colour parameters with predetermined values for the colour parameters, the predetermined values typically corresponding to colour parameters of a predetermined material composition.

22 Claims, 19 Drawing Sheets

(56) References Cited

U.S. PATENT DOCUMENTS

| | | | |
|---|---|---|---|
| 6,205,195 B1 * | 3/2001 | Lanza | 376/157 |
| 6,313,465 B1 | 11/2001 | Nitoh et al. | |
| 6,392,248 B1 | 5/2002 | Takahara et al. | |
| 7,026,627 B2 | 4/2006 | Fowler, Jr. | |
| 7,435,965 B2 | 10/2008 | Fuchs et al. | |
| 2005/0195932 A1 | 9/2005 | Keyser et al. | |
| 2010/0006769 A1 * | 1/2010 | Kraft et al. | 250/370.11 |

FOREIGN PATENT DOCUMENTS

| | | |
|---|---|---|
| EP | 0 358 965 A1 | 3/1990 |
| GB | 1445592 | 2/1974 |
| GB | 1446692 A | 2/1974 |
| GB | 2 071 312 A | 9/1981 |

OTHER PUBLICATIONS

German Search Report Dated Jul. 20, 2006, based on German Patent Application No. 10 2006 033 661.5-52.

G. Nebbia et al. "Detection of buried landmines and hidden explosives using neutron, X-ray and gamma-ray probes", europhysics news, Jul./Aug. 2005, pp. 119-123.

* cited by examiner

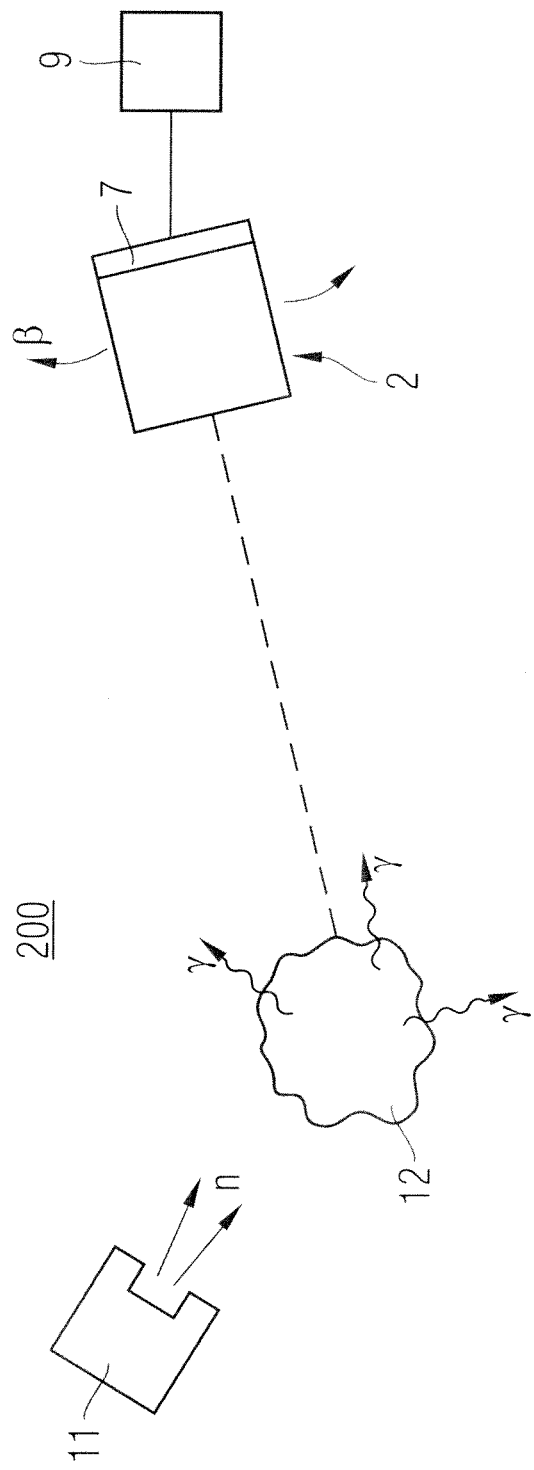

METHOD FOR DETERMINING THE MATERIAL COMPOSITION OF A MATERIAL SAMPLE

CROSS REFERENCE TO RELATED APPLICATION

The present application claims the benefit of priority of International Patent Application No. PCT/EP2007/056005, filed on Jun. 18, 2007, which application claims priority of German Patent Application No. 10 2006 033 662.3, filed Jul. 20, 2006. The entire text of the priority application is incorporated herein by reference in its entirety.

FIELD OF THE INVENTION

The present invention relates to a method for determining the material composition of a material sample which emits radiation, a suitable detector assembly for implementing the method, and the use of this detector assembly.

BACKGROUND OF THE INVENTION

Nowadays, radiation of highly varied types, such as alpha, beta and gamma radiation, or particles, such as electrons, neutrons, ions or nuclei, are used for the analysis of material samples. Radiation analyses of this type are implemented for example in the localisation and identification of dangerous substances, for example concealed explosives, but also in the field of medicine in combination with imaging methods, in radiation measurement or in research on the structural analyses of materials. In this case, radiation detectors which make it possible to establish the direction of incidence or the origin of the radiation to be detected and evaluation methods for identifying the materials present in the respective radiation source are in particular required.

In the methods used to date, incident radiation to be detected was initially collimated by hole or lamella collimators in front of the actual detector material. Usually, a hole collimator of this type is formed from a plate of a material with a high atomic number, for example lead, tungsten, iron or brass, which plate is provided with a plurality of holes of a small diameter. In this way it is possible for example for only the gamma rays passing through the corresponding collimator subsequently to be recognised by a detector.

In this case a low sensitivity of the detector is a drawback, in particular at high radiation energies, because only the gamma rays which are incident parallel to the axes of the holes or at a small aperture angle are to be used in the evaluation. Therefore, the wall thickness between the collimator holes must be selected as a function of the collimator material, collimator thickness, hole diameter and photon energy. In particular for photons with energies of more than 200 keV, the necessary wall thickness between the collimator holes may exceed the diameter of the holes. The transmission, i.e. the cross-sectional area of all collimator holes in relation to the total face area (front face) of the respective detector, will then be low. The absorbing cross-sectional area then actually exceeds the penetrable surface area of the collimator. The higher the energy of the particles or radiation to be detected, the more unfavourable the transmission becomes and the lower the probability of the respective detector responding. This applies in particular to high energy gamma radiation. Alongside the aforementioned collimator-based detectors, detection methods which detect direction without collimation are also known, such as the Compton camera or the positron camera in positron emission tomography (PET).

The principle of the Compton camera is that instead of the aforementioned mechanical collimation, an electronic collimation is performed to determine the direction of radiation incident on the corresponding detector system. A radiation photon incident in a Compton camera thus initially passes through a first scattering detector in which Compton scattering takes place. If the scattering detector is configured in a granular manner, the location of the interaction will be detected. In a second absorption detector at a distance, the scattered photon is completely halted, it being possible to record the location and the energy. If the two scatterings in the scattering detector and absorption detector are shown to be coincident, then the position of the radiation source which emitted the photon can be reconstructed on a cone surface with the apex at the location of the scattering detector. The location of the radiation source can be determined by means of suitable tomographic reconstruction algorithms. This principle is primarily used in astrophysics for the measurement of gamma radiation sources with photon energies of up to 30 MeV.

A drawback is that the scattering detector must be very thin so that at most one Compton interaction takes place therein. This substantially reduces the probability of an interaction in the detector. Furthermore, complete energy deposition of the photon energy in the absorption detector must be ensured, and in real detector systems this is always achieved only for a fraction of the incident photons. This reduces the efficiency of the Compton camera.

Locating explosives, for example landmines in a cleared area or concealed explosives in luggage or cargo, is a particular field of application of detectors which use bearing resolution.

Explosives generally have a high concentration of nitrogen compounds. The recognition of these nitrogen accumulations must generally take place in the environment of other lighter atoms, such as organic compounds and plastics material, sand or earth, which are part of the soil in the case of landmines or which form the main component of the container to be analysed. These materials primarily comprise light elements, such as carbon (C), nitrogen (N), oxygen (O), fluorine (F), silicon (Si), magnesium (Mg) etc., which emit high energy gamma quanta or gamma radiation under neutron excitation (activation with neutrons). Conventionally, for example at airports, transmission X-ray devices are used for luggage inspection. However, no element-specific signal is detected in this way, explosive devices being detected only on the basis of their shape in the X-ray image.

X-ray backscattering detectors and methods which employ neutrons are proposed for the detection of landmines in the ground, for example in "Detection of buried landmines and hidden explosives using neutron, X-ray and gamma-ray probes", G. Nebbia and J. Gerl in europhysics news, July/August 2005, pages 119 ff. In this case, backscattered neutrons or gamma quanta from the neutron capture, for example, are measured with scintillation counters. This generally requires high-volume detector assemblies which must be moved close to the ground. This does not allow the detection of the direction of the gamma source, produced for example by neutron activation, relative to the detection system above the ground.

A further difficulty is the identification of individual emission lines, which are characteristic for example of nitrogen or other material or element compositions, from a measured intensity spectrum in order to make predictions concerning the composition of the respective material samples and to detect the presence of explosives. Disadvantageously, this requires energy-resolving spectroscopy with a high energy resolution. This involves a high technical expense and leads to lower reliability of the relevant detector.

An object of the invention is therefore to determine the presence of predetermined materials from the detected radiation. A further object of the invention is to provide a detector assembly which allows improved detection and evaluation of radiation.

SUMMARY OF THE INVENTION

This disclosure provides for a method for determining the material composition of a material which emits radiation. The method accordingly provides the following method steps:
a) Recording a spectrum of the energy deposited in a detector material by the radiation;
b) Determining a first energy deposited in a first energy range, a second energy deposited in a second energy range, and a third energy deposited in a third energy range;
c) Assigning a first colour parameter to the first deposited energy, a second colour parameter to the second deposited energy, and a third colour parameter to the third deposited energy; and
d) Comparing the assigned colour parameters with predetermined values for the colour parameters, the predetermined values typically corresponding to colour parameters of a predetermined material composition.

According to the invention, a first, second and third colour parameter are assigned to the three deposited energies. Analogously to human colour vision, the intensity of the deposited energy is thus used for at least three energy ranges, or wavelength or frequency ranges. The first deposited energy determines the first colour parameter, the second deposited energy determines the second colour parameter, and the third deposited energy determines the third colour parameter.

According to the invention, a decision is then made as to the presence in the material sample of a material being searched for, preferably in dependence on the colour parameters. In this case, a predetermined combination of colour parameters is for example assigned to a material being searched for.

For example, when activated with neutrons, the activated material generally emits characteristic spectral lines, which usually require a high energy resolution of the detector employed so as to be detected. According to the invention, the gamma emission spectrum of a known material which is to be detected is divided into the three energy ranges and corresponding reference colour parameters are predetermined. By comparing the detected combination with these predetermined colour parameters, it is then possible to identify the material being searched for from the colour parameters, determined in accordance with the invention, of the spectrum of the deposited energy in the detector element.

In this case, volumes may for example be established in a three-dimensional colour parameter space. If a vector determined in accordance with the invention, formed from the three colour parameters, falls within a volume of this type, then the material being searched for can be considered to have been recognised. The distance between the two energy ranges or the centre of gravity between the two energy ranges is preferably selected as a function of an energy resolution of the detector element In preferred embodiments of the method, further energy regions and colour parameters are used, and this leads to a higher-dimension colour parameter space.

In a development of the method according to the invention, a step in which a material sample is activated by irradiation with neutrons is further provided.

In an advantageous development of the method according to the invention, a detector element is used, the detector element comprising a front face and a rear face, a first detector material and a second detector material between the front face and the rear face. A space between the front face and the rear face of the detector element is filled by a plurality of continuous regions of the first detector material and at least one continuous region of the second detector material, and each region connects the front face to the rear face of the detector element. The regions are arranged in such a way that each region of the first detector material borders on at least one region of the second detector material. According to the invention, an energy deposition takes place in at least the regions of the first detector material as a function of the angle of incidence of the radiation on the detector element.

A preferred angle of rotation, for which the energy deposited in the first and/or second energy region is a maximum or a minimum, is established. Then, a direction of the radiation source relative to the detector element can be determined based on the preferred angle of rotation.

A step is further preferably provided for determining a direction parameter from the ratio of the first and second deposited energies. The direction parameter is preferably determined for different detection directions, the respective detection directions being substantially normal to the front face of the detector element. A direction of the radiation source relative to the detector element is then established from the direction parameter.

When the detector element rotates by an angle of rotation, the count rate and the deposited energy in the various energy ranges change. These detection characteristics depend on whether the preferred direction of the detector element is rotated towards or away from the radiation source. For a higher energy part of the spectrum, the respective count rate or intensity in the spectrum decreases when the detector or the preferred direction thereof is moved away from the radiation source. The number of events recorded in the lower-energy part of the spectrum simultaneously increases.

A detector element in which the first and second regions comprise active and separately readable detector materials is preferably used. In this case, the energies determined for the first, second and third energy ranges and deposited in the first and second detector materials are then added. Total signals are thus formed from the initially separately read signals for the colour parameters in the different energy ranges. This allows the material analysis by analogy with colour vision to be performed even more reliably, because it is possible to achieve an improvement in the data by a factor of two or more. The separately read signals of the first and second regions are simultaneously separately used for the directional analysis.

According to the invention, a detector assembly for the detection of radiation emitted by a material sample is further provided, comprising:
a) at least one detector element which comprises an active detector material;
b) a detection means which is coupled to the detector element and receives signals from the detector element; and
c) an evaluation means, which detects a distribution of the energies deposited in the detector materials as a function of the signals and implements a method for determining the material composition in accordance with the method according to the invention.

In the following, a detector material is understood to mean any material which fills the respective geometric shape of the first and/or second regions of the detector element. In particular embodiments of the invention, the respective first and/or second (detector) material has predetermined physical properties, such as absorption properties with respect to particular radiation, scintillator properties or the like. It is preferable for one of these detector materials to be an active material which delivers a signal, for example scintillation light, when it is struck by a gamma quantum. The other detector material may in this case also be an active material, or act as a passive material, i.e. an absorber material for the relevant radiation or quanta, and in the latter case produce no signal upon the incidence of radiation.

In a development of the detector assembly according to the invention, the detection means is configured as a preferably energy-resolving light measurement means which detects scintillation light as signals. The light measurement means in this case preferably detects the scintillation light from the active detector material integrally. A light measurement means, for example a photomultiplier, or even another signal analysis means, thus measures the energy deposited in the scintillating regions. A pulse-height spectrum of the deposited energy may thus be established.

In an alternative embodiment, the active detector material is formed as a semiconductor detector, making it possible to read electrical signals. If regions are configured as semiconductor detectors, the incident photon radiation produces free charge carriers, which may be evaluated as rapid electrical signals. If semiconductor detectors are used, no additional light measurement means is necessary.

The evaluation means preferably comprises a storage means in which the value combinations of colour parameters which correspond to known material compositions are present. By comparison with these known combinations, the evaluation means recognises whether a known material composition, for example explosives, is present in the material sample.

The invention further provides for a use of the detector assembly according to the invention for the detection of explosives in material samples which are to be analysed, or in clearing landmines. The use for the detection of nitrogen-containing materials, such as explosives, in luggage or cargo inspection is particularly advantageous.

Further advantageous configurations and developments of the invention are the subject-matter of the sub-claims and the embodiments described below.

BRIEF DESCRIPTION OF THE DRAWINGS

In the following, the invention will be described in greater detail, by way of example, by means of preferred embodiments and example embodiments, with reference to the drawings, in which:

FIG. 1 shows a first embodiment of the detector assembly according to the invention;

In the figures, like or functionally identical elements have been provided with the same reference numerals unless otherwise specified.

DETAILED DESCRIPTION OF EMBODIMENTS

Figure 2A:
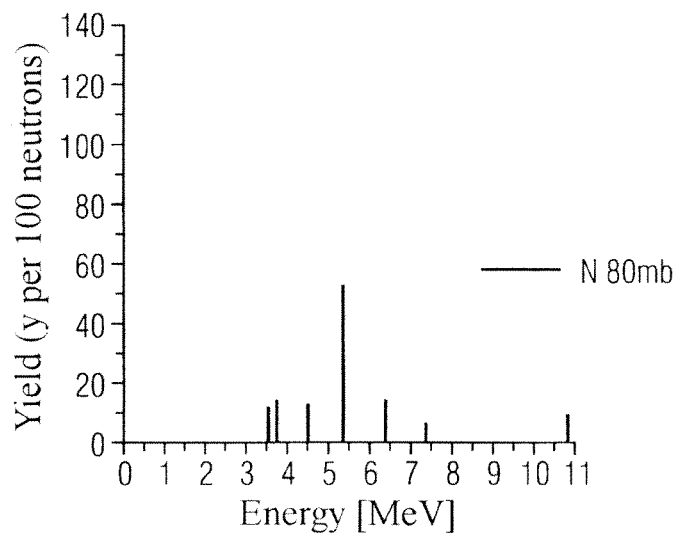
FIG. 2 shows gamma lines produced by neutron activation.
Figure 2B:
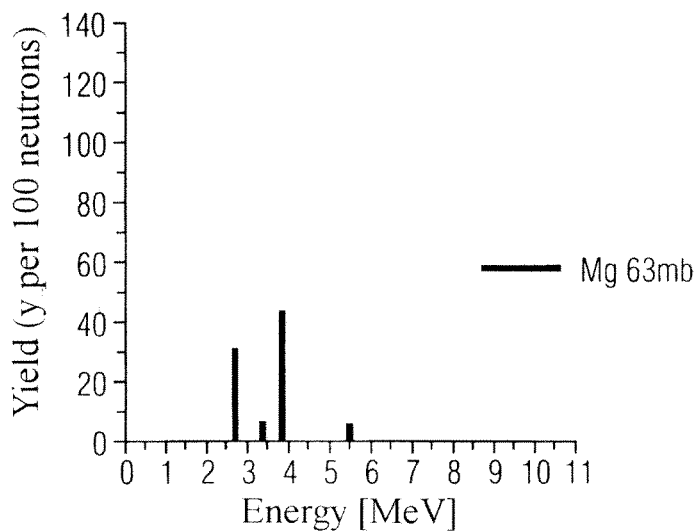
Figure 2C:
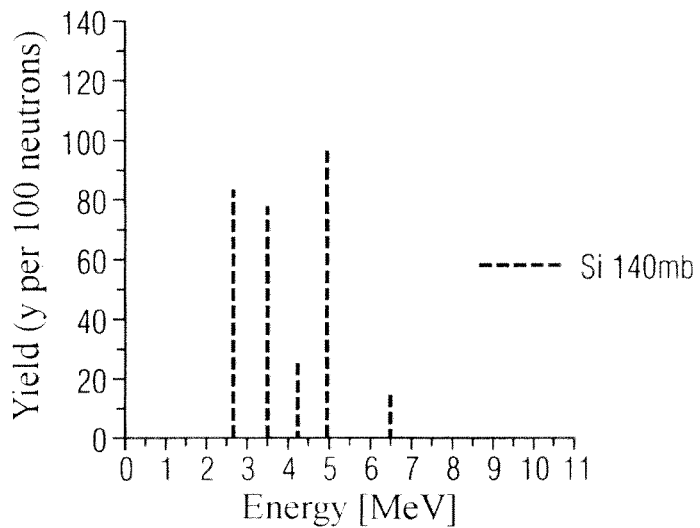
Figure 2D:
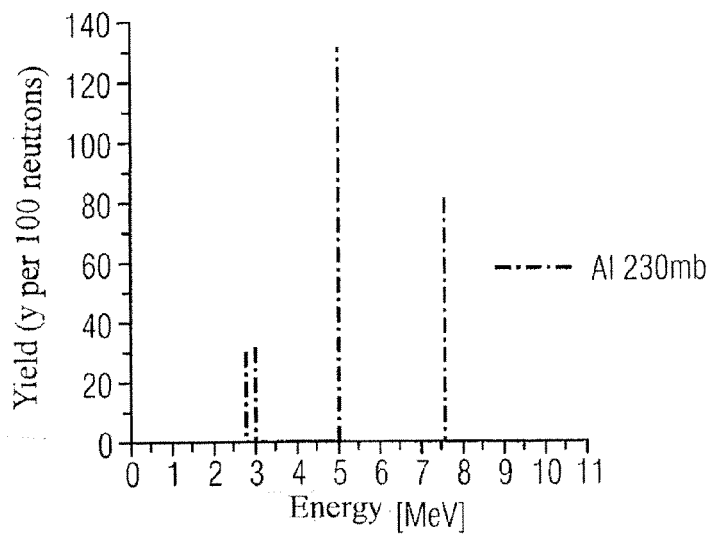
Figure 2E:
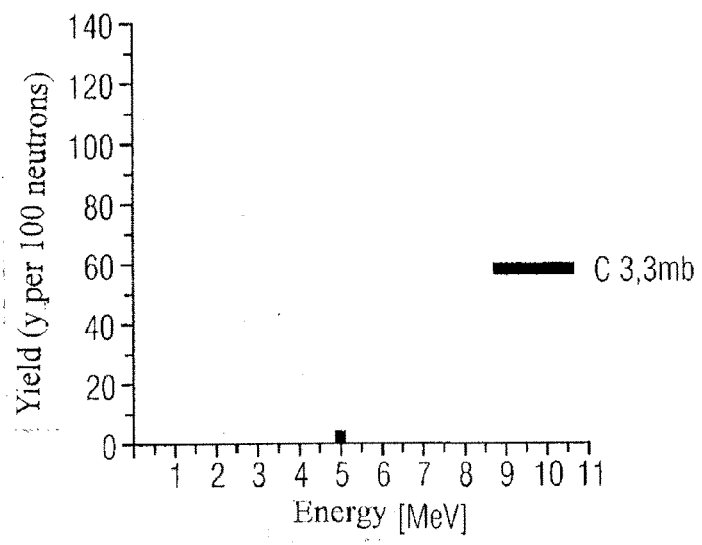

The invention allows the recognition of particular elements in a material sample which is to be analysed. The detection of explosives, for example for clearing mines, is a particular application thereof.

A first embodiment of the detector assembly according to the invention therefore provides a neutron source for the bombardment of a material sample, such as a particular region of the ground, with neutrons. The bombarded material is thus activated and emits characteristic gamma radiation.

FIG. 1 shows a corresponding detector assembly 200 according to the invention. A neutron source 11 is provided and preferably emits aligned neutrons n, with which a material sample 12 is irradiated. When the neutrons are captured, a nuclear reaction takes place in the respective material sample, in such a way that in conjunction with this, gamma quanta are emitted and are detected by a detector element 2, which is arranged so as to be rotatable and comprises an active detector material, such as a scintillator material. A photomultiplier 7, which integrally measures the energy deposited in the active detector material and feeds this to an evaluation means 9 is provided for this purpose. If for example the detector element is configured so as use bearing resolution, the position of the gamma source, i.e. the material sample 12, may be determined with angular resolution by rotation through the angle $\beta$.

The material of the earth's surface substantially comprises light elements H, C, N, O, Mg, Si, Al. $SiO_2$, silica sand and aluminium magnesium silicate occur particularly frequently. As neutron energy increases, the neutron-capture cross-section of these elements decreases. Neutrons below 4 MeV are captured particularly frequently. For example, the capture cross-sections for thermal neutrons are 3.3 mb for carbon, <0.2 mb for oxygen, 80 mb for nitrogen, 63 mb for magnesium, 130 mb for silicon, and 230 mb for aluminium. In particular in the elements nitrogen, magnesium, silicon and aluminium, the capture of a neutron leads to energy gain of between 4.5 and 10 MeV. These excited states return to the ground state via a cascade via one or more intermediate states with emission of gamma radiation. Only nitrogen has a direct transition, with angular momentum j=3/2 to j=1/2, from 10 MeV with 10% probability. Usually, three to five predominant lines are obtained in the corresponding gamma spectrum, at energies between 2.5 and 7.5 MeV.

Figure 2F:
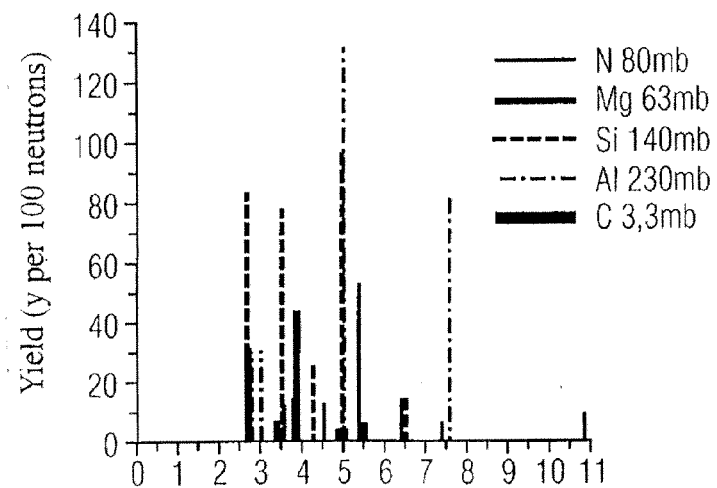

FIG. 2 shows typical yields of gamma radiation after neutron reactions or a neutron activation of nitrogen, magnesium, silicon, aluminium and carbon (FIG. 2*a* to *e*) and yields which result in a corresponding element or material sample mixture (FIG. 2f). In this case, the yield gives the number of gamma quanta per 100 neutrons captured. In particular, nitrogen, which is important for the recognition of explosives, has four significant lines between 5 and 6.5 MeV and the 10% excitation at 10.8 MeV.

High resolution spectroscopy is usually tried in order to resolve individual lines in the resulting gamma spectra and thus verify the presence of nitrogen deposits. However, the high energy resolution of a corresponding detector is associated with an extremely low probability of a response and an extremely high apparatus expense in order to be able to distinguish between lines of different elements. These lie very close to one another, as is shown in FIG. 2f.

According to the invention, no extremely high resolution gamma spectroscopy takes place, but complete spectra are recorded. The respective gamma lines produce wide Compton distributions in the respective detector element, which distributions extend from the Compton edge to low energies. To detect a material being searched for, for example nitrogen, in the material sample activated with neutrons, it is now provided in accordance with the invention for the recorded spectrum to be divided into at least three parts and for the integral intensity to be determined in each case over these three ranges, a colour parameter being assigned to each intensity.

Figure 3:
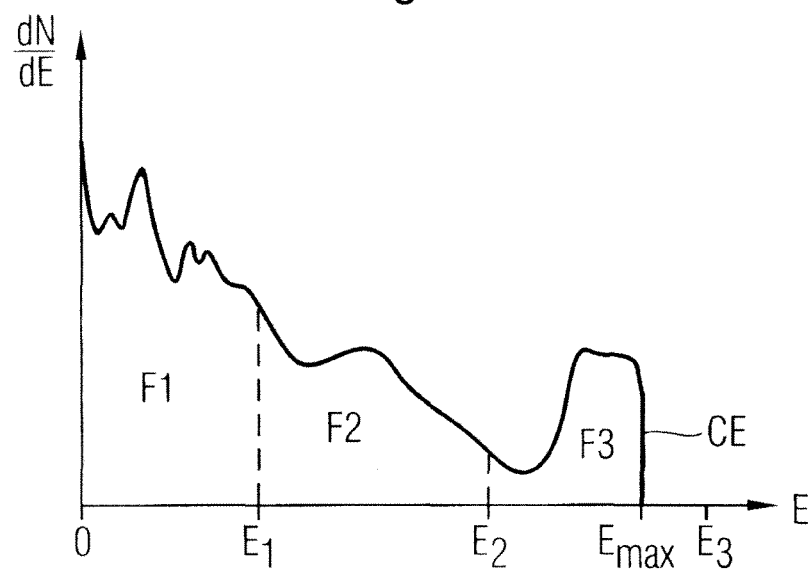
FIG. 3 shows a division according to the invention of an intensity spectrum for material analysis.

According to the invention, a recognition method similar to colour vision is used to detect particular elements in the material sample. FIG. 3 shows by way of example a recorded intensity spectrum or a recorded distribution of the energies deposited in the active detector material, i.e. in the scintillator material. In this case, CE indicates the Compton edge for a maximum energy transfer $E_{max}$. The deposited energy is initially detected in a first energy range, for example between 0 and $E_1$.

The integral over the intensity dN/dE between 0 and E1 is also calculated, and a first colour parameter F1 is thus determined. The deposited energy in a second energy range between E1 and E2 is determined in that the integral between $E_1$ and $E_2$ is calculated in order to determine a second colour parameter F2. Lastly, in accordance with the invention, an integration is performed between $E_2$ and $E_3$ in order to calculate the corresponding integral and to derive the colour parameter F3. For example, the energy ranges could lie between 1 and 3 MeV, between 3 and 5 MeV, and above 5 MeV.

A characteristic spectrum, and therefore also a characteristic combination of colour parameters F1, F2 and F3 is obtained for each of the elements shown in FIG. 2 by way of example. Analogously to colour vision, an overall colour signal with a colour impression is obtained from three energy or frequency ranges, which substantially correspond to the three primary colours red, green and blue in human colour vision. In accordance with the invention, a colour impression is now determined from the measured spectrum via the combination (F1, F2, F3).

In a three-dimensional colour space of this type, which is spanned by the coordinates F1, F2 and F3, it is in principle possible to assign a vector, or at least a volume, in the colour space to each element to be detected. If a measured or calculated combination of colour parameters (F1, F2, F3) for a spectrum of an unknown material sample now leads to a vector (F1, F2, F3) which appears in a volume of this type, then an element which is being searched for is recognised. Thus, despite the low energy resolution of the detector employed, a colour analysis of the spectrum may take place at a sufficiently high count rate and the material of the material sample, which is for example activated with neutrons, may thus be recognised.

Figure 4:
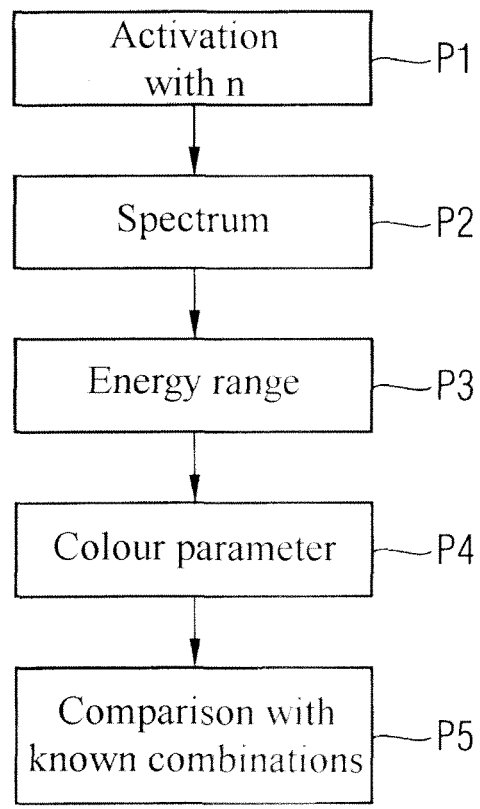
FIG. 4 shows a first sequence of method steps according to the invention.

FIG. 4 explains the method steps to be undertaken. The activation with neutrons takes place in a first step P1. Subsequently, a complete spectrum of the radiation energy deposited in the respective detector material is recorded, the radiation having been emitted by the material sample (step P2). The deposited energies in the three energy ranges are then determined for example by integration (step P3) and corresponding colour parameters F1, F2, F3 are assigned (step P4). A respective colour parameter may for example be selected so as to be proportional to the corresponding energy or may instead initially be multiplied by a weighting factor. By a comparison with known combinations of colour parameters for reference compositions or even individual elements, it is detected in step P5 whether a relevant element is present in the material sample.

Direction-sensitive recognition of radiating material, or material excited to emit radiation, of a material sample is particularly favourable for the detection of explosives.

Figure 5:
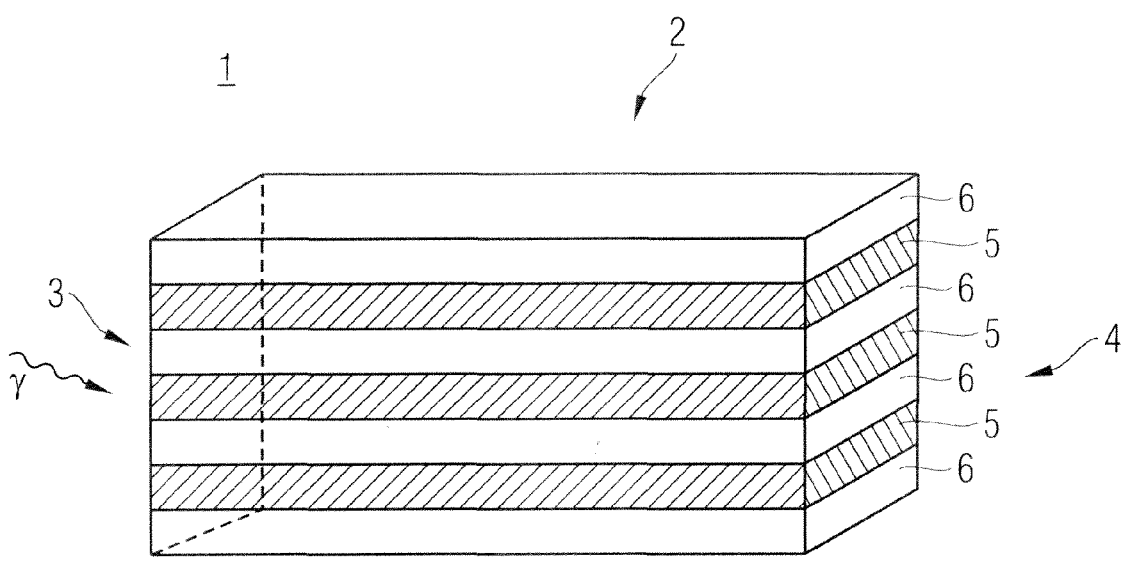
FIG. 5 shows a detector element according to the invention.

FIG. 5 shows a detector assembly 1 with a detector element 2 which allows detection using bearing resolution. In the embodiment according to FIG. 5, the cuboid detector element 2 comprises a front face 3 and a rear face 4. In this case, gamma rays γ arrive in the detector element 2 substantially through the front face 3.

Alternating layers 5, 6 of a first detector material and a second detector material respectively are provided. These layers 5, 6 connect the front face 3 to the rear face 4. For example, the layers 5 are manufactured from an absorber material for Compton-scattered electrons and the layers 6 are manufactured from a scintillator material.

The light emission produced by the scintillator material is preferably measured at the rear face 4 of the detector element. From the amount of light measured, or the energy deposited in the layers 6 which comprise scintillator material, it is possible to determine the direction of incidence of the radiation γ relative to a preferred direction or plane of the detector element. In the detector element 2, which in this case is formed for example from layers 5, 6, a preferred plane through the planes of the layers is specified.

Figure 6:
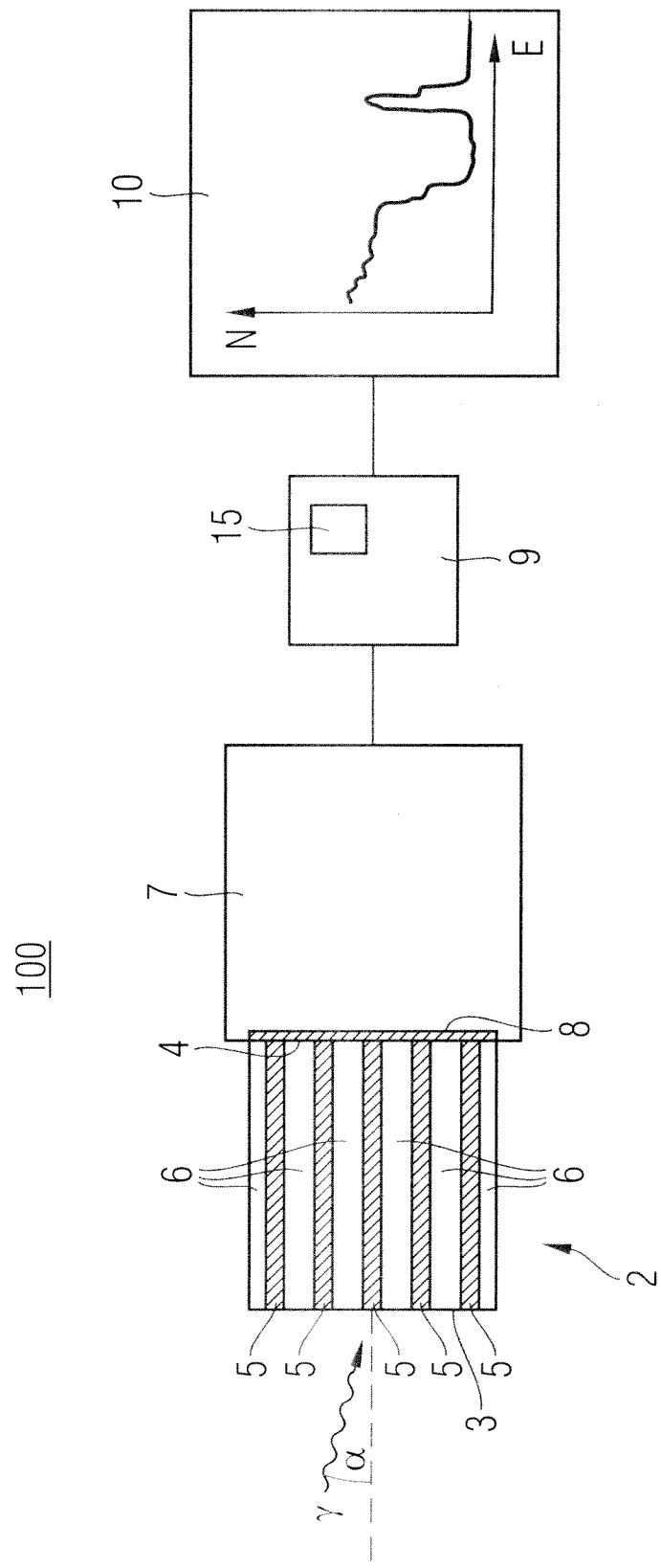
FIG. 6 shows a second embodiment of the detector assembly according to the invention.

FIG. 6 shows an expanded detector assembly 100. The detector element 2, which is constructed from layer-like regions, comprises alternating layers 5, 6 of absorbing and scintillating detector material, a front face 3 being directed substantially in the direction of a radiation source for gamma radiation γ. To the rear face 4 a photomultiplier 7 is coupled, which integrally detects scintillation light from the layers or regions 6. In this case, a photocathode 8 lies against the rear face of the detector element 2.

An evaluation means 9 with a storage means 15 reads the appropriate signals from the photomultiplier 7 and generates, in particular, a spectrum for the deposited energy in the scintillator material of the detector regions 5. The evaluation means 9 may for example be embodied as a computer which is connected to the photomultiplier via a suitable interface, and which performs a pulse-height analysis on the events detected. The corresponding computer may also perform the recognition of the material composition, as was explained in relation to FIG. 1 to 4. During the direction detection, the events in which energy is deposited in the scintillator material are initially counted and recorded as a function of the deposited energy. The direction or the angle of the preferred direction of the detector element relative to the respective gamma radiation source is determined from the form of the recorded spectrum, and also, the elemental composition of the respective gamma radiation source is decided on or the detector element is turned and/or rotated in such a way that the direction of the radiation source relative to the front face can be determined from the change in the readable signals as a function of the respective position of the detector element.

FIG. 6 shows the angle of incidence α between the preferred direction or plane of the detector element and the forwards movement of the gamma quanta. This angle is also the preferred angle of the direction of escape of the electrons when high energy gamma quanta are incident. According to the invention, the radiation to be detected is collimated in the detector material itself. A complex collimator for the detector element 2 is not required.

When detecting the gamma radiation which is produced by materials activated by neutrons, energies of gamma quanta of more than 500 keV are typically involved. When detecting photons of this type in detector materials, the energy of the photon is generally not completely transferred to electrons, and is also transferred to electron-positron pairs when a threshold energy of Eγ=1022 keV is exceeded.

In the following, the functioning of the detector element which uses bearing resolution or of the detector assembly is explained by means of Compton scattering with average energies between 100 keV and 10 MeV, at which a partial transfer of the gamma energy takes place. Complete energy transfer is predominant at lower energies Eγ<100 keV via the photoelectric effect and at high energies Eγ>>1 MeV via pair production. At low gamma energies, the electrons produced are emitted at high lateral angles relative to the direction of the photons. The higher above the respective reaction thresholds the photon energy lies, the more the electrons or even positrons are scattered in bundles at forwards angles, i.e. in the direction of the gamma photons. As the energy of the radiation to be detected increases, the secondary electrons or positrons are also increasingly scattered forwards, as is the case for all absorption processes, such as the photoelectric effect, the Compton effect, and pair production. The electrons produced by the gamma photons can be decelerated easily, i.e. over a short distance, in a solid body. It is therefore easier to achieve collimation or direction-sensitive reading of the corresponding signals.

The direction selection takes place by means of the geometry of the various detector regions, which are formed so as to be laminated, for example, as layers or plates, as is shown in FIGS. 5 and 6, the layer thickness being selected so as to be less than the average electron range. Because only a fraction of the energy is transferred to the detector via the predominant Compton scattering process, this typically results in plate thicknesses of 1-2 cm. The detector plates should be separated from one another in such a way that an electron does not cause a signal in two different plates. This may for example be achieved in that the individual plates are separated from an active detector material by passive absorber layers. With strong absorbers such as lead or iron, layer thicknesses of a few millimeters are generally sufficient.

The corresponding detector assembly is suitable in particular for the energy range between 500 keV and 10 MeV, in which the Compton effect is predominant. However, it may also be applied even if just a few gamma lines lie above the Compton energy range. For example, in particular, the nitrogen line at 10.8 MeV can be detected. The physical processes and detection methods described below are explained in detail by means of the Compton effect, but are also suitable for application in other energy ranges. The Compton effect results in a fixed relationship between the angle of incidence of the photon and the direction of escape of the Compton-scattered electron produced. The energy ΔE transferred from the photon to the Compton electron is dependent on the scattering angle. The maximum energy transfer ΔEmax results for a scattering at 180°. The Compton-electron then continues to move in the same direction as the incident photon with the energy $E_{max}$. The maximum energy transfer results $$\Delta E_{max} = E_{max} = E_\gamma \frac{2\varepsilon}{1+2\varepsilon}. \quad \text{(Equation 1)}$$

as
FIG. 3A shows
Where $\varepsilon = E_\gamma/m_e c^2$, and $m_e c^2 = 511$ keV corresponds to the rest mass of the electron.

FIG. 3A shows the angular dependence of the scattering as a portion of a Klein-Nishina plot. The effective cross-section dσ/dΩ is plotted in barns against the scattering angle ν of the electron. As the gamma energy increases, the Compton electrons are scattered increasingly forwards. This also applies to pair production and to the photoelectric effect. In FIG. 3A, $\varepsilon=1$, Eγ=0.511 MeV and $\varepsilon=5$, Eγ=2.555 MeV. Even when $\varepsilon=1$, the electrons are already scattered very strongly in the forward direction.

The Compton electron loses its kinetic energy through collisions with further shell electrons in the detector material, and this leads to ionisation. Even with further collisions with secondary electrons, a primarily forward direction of scattering results at high energies owing to conservation of momentum. The electrons produced thus have a high probability of escaping in the forward direction of the original gamma quanta. This results in a "forward cascade" of the emitted electrons. The resulting secondary electrons further deposit their energy in the material and excite light emission in the scintillating detector material. This is registered for example by the photomultiplier 7. The corresponding electrical signals produced, which are introduced to the evaluation means 9, are proportional to the energy deposited in the scintillator material of the detector. The corresponding pulse-height spectrum then has a Compton edge and the photo peak.

Figure 7A:
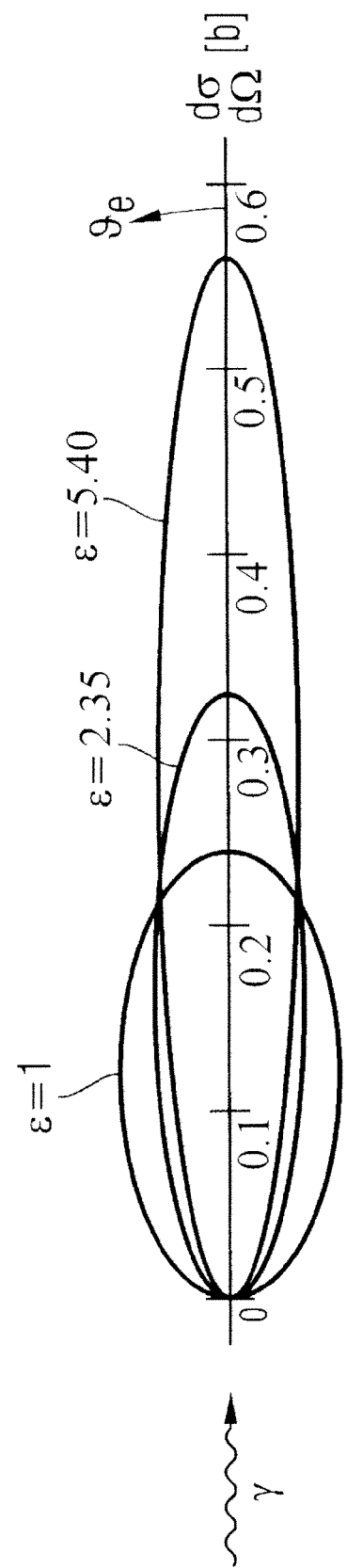
FIG. 7A shows a Klein-Nishina plot of the Compton scattering.
Figure 7B:
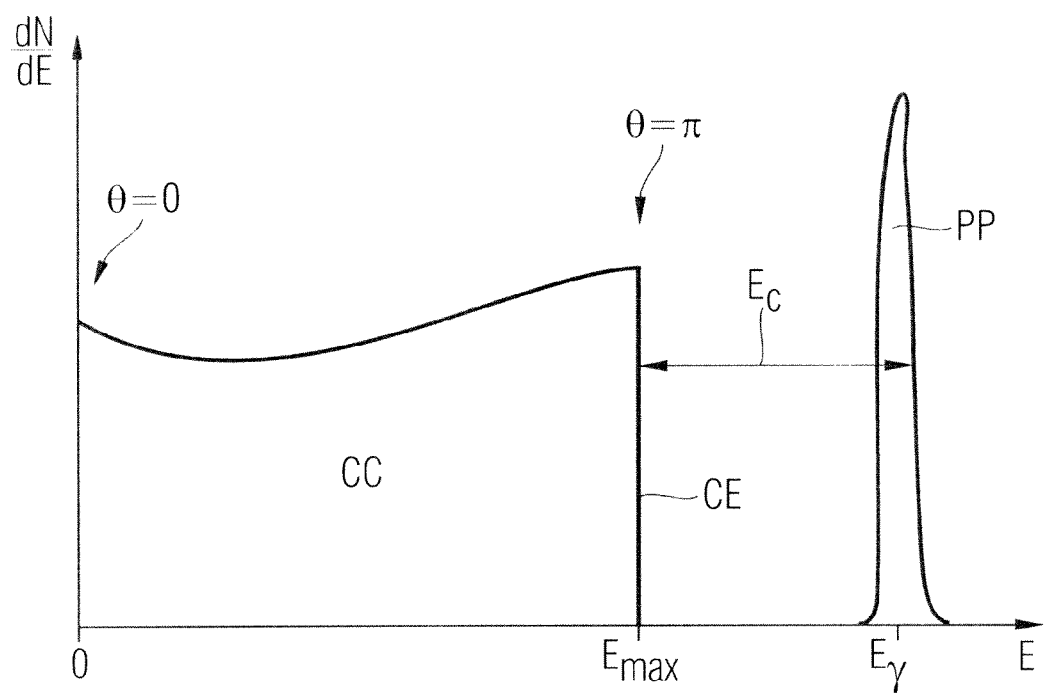
FIG. 7B shows a gamma intensity spectrum.

FIG. 7B shows by way of example a spectrum of the electrons for a scattering with gamma quanta of energy Eγ. The Compton continuum CC is obtained up to the maximum transfer energy $E_{max}$, the lowest energy being achieved at a scattering angle of θ=0°, and the maximum energy $E_{max}$, which forms the Compton edge CE, being achieved by the forward scattering where θ=π. A photo peak PP is further shown and occurs at a distance of Ec=Eγ−Emax from the Compton edge CE.

The energy deposition is not sensed in the whole of the detector volume between the front and rear face, but only in the particular regions or segments which comprise scintillator material. This means that a direction-dependent modulation of the energy deposition can be established by means of Compton electrons. According to the invention, an amount of light proportional to the energy deposited in the respective scintillating detector material is detected by the photodetector. It does not make any difference which side of the detector element the photomultiplier 7 is arranged on.

To simplify the explanation, only Compton scattering processes which have a maximum scattering angle, i.e. 180°, will be considered. In the context of a CSDA model, the Compton electrons thus obtained release their energy along a path which extends in the direction of the respective incident gamma quantum. CSDA stands for continuous slowing down approximation. According to the angle and location of the incidence of the gamma quantum on the detector element, different energy depositions result in the scintillator material.

Figure 8:
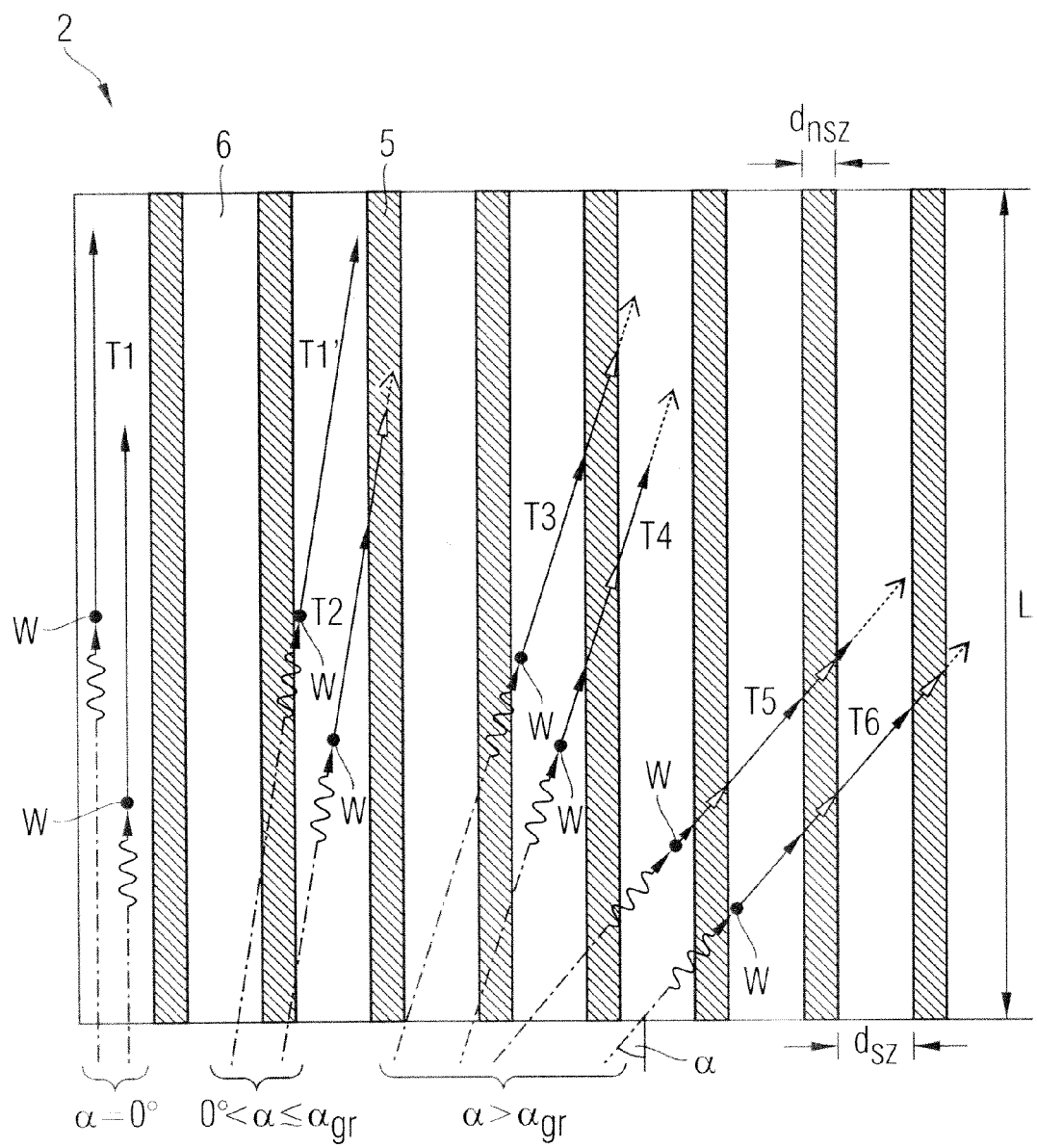
FIG. 8 shows the path of radiation trajectories through a detector element.
Figure 9:
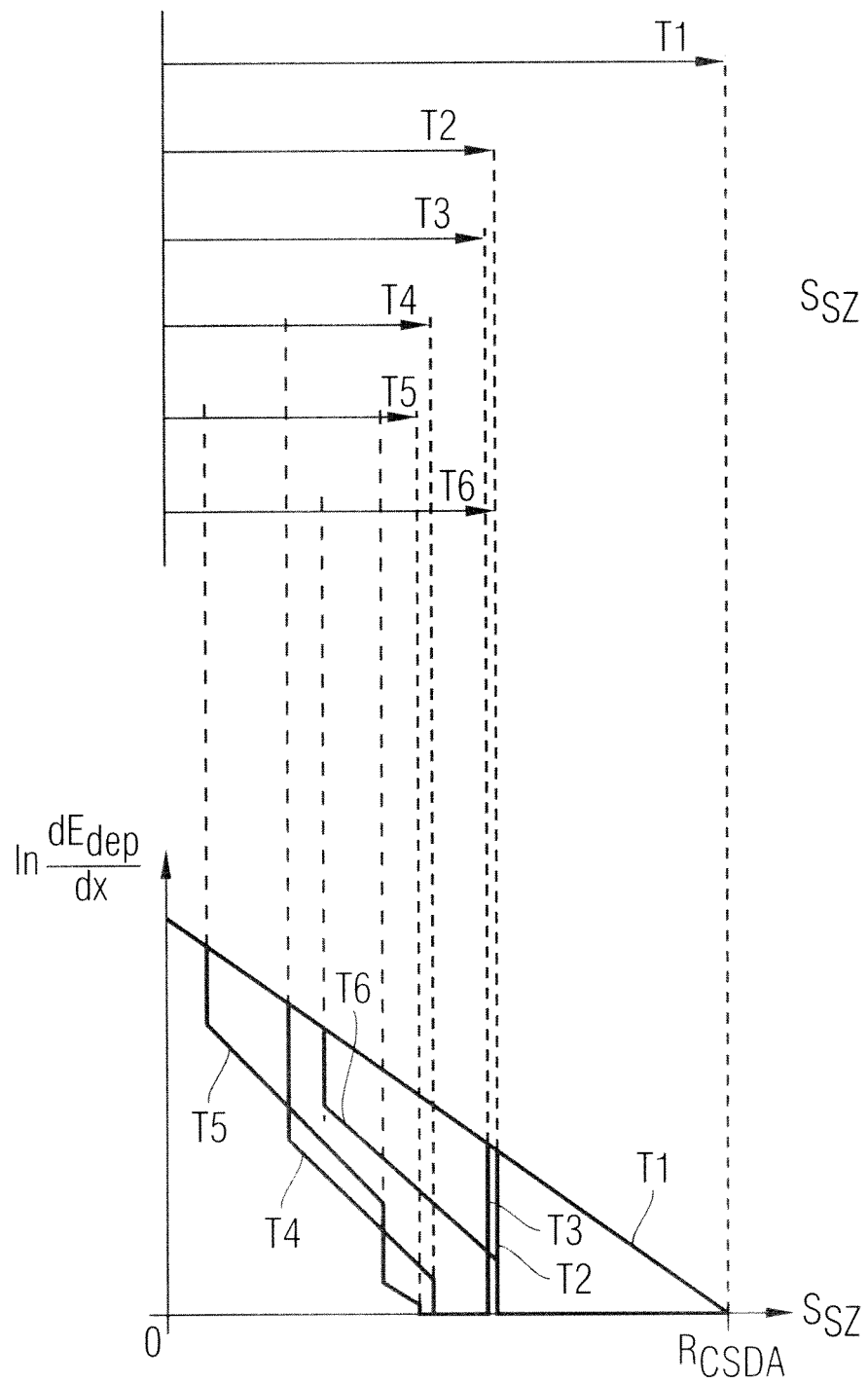
FIG. 9 shows distances traveled and energy depositions in the detector element.

FIG. 8 shows possible trajectories through a detector element 2 and FIG. 9 shows the remaining path length $S_{SZ}$ of a respective trajectory in the scintillator material and the energy deposition of a respective gamma quantum.

In FIG. 8, the respective interaction points W, i.e. the location of a respective 180° Compton scattering, are shown by filled-in circles. The dot-dash lines and wavy lines indicate the approaching photon. The arrows with solid arrowheads represent an energy deposition of the Compton electrons in the scintillator material, and the arrows with a hollow arrowhead represent energy deposition in absorbers or non-scintillating material of the detector regions 5.

In the case of frontal incidence, i.e. parallel to the planes of the detector material layers, 5, 6, and when the gamma quantum enters a region 6 of scintillating detector material as shown by the trajectories T1, the whole of the energy is deposited in a segment or a layer of the detector element. The respective energy deposition $E_{dep}$ in regions with scintillating material is shown more precisely in FIG. 5.

FIG. 9 first shows the remaining path lengths $S_{SZ}$ in the scintillator material for the trajectories T1-T6 shown in FIG. 8. FIG. 9 further shows in a logarithmic representation the energy depositions $E_{dep}$ in the scintillator material as a function of the path length $S_{SZ}$.

If the length L of the detector regions is greater than $R_{CSDA}$, i.e. the range of the radiation in the respective material, the highest energy deposition in the scintillating material takes place for a frontal incidence on the detector element along the trajectory T1. The whole of the electron energy is then deposited in one of the detector regions with scintillating detector material. This applies to all energies of the Compton electrons.

In accordance with FIG. 5, energy is deposited in the scintillator material over the whole range of the trajectory T1, and this energy is measured for example by means of an attached photomultiplier 7.

As the angle of incidence α increases, the probability increases that Compton electrons of all energies will deposit part of their energy not in the scintillating material, but in one of the absorber layers 5. This reduces, for each electron energy spectrum, the probability of a complete energy deposition in the respective active detector layer.

For the trajectory T4, for example, an energy deposition initially takes place in the scintillator material, then in the absorber material or non-scintillating material and once more in the scintillator material. The remaining path length in the scintillator is therefore considerably smaller by comparison with the trajectory T1.

The graph of the energy deposition in the scintillator material also clearly shows steps, which are brought about by the energy deposition in the absorber material. The lower the thickness $d_{SZ}$ and $d_{NSZ}$ of the regions with the scintillator material or absorber material, the greater the probability of an incomplete energy deposition in a corresponding scintillator material segment.

If the range $R_{CSDA}$ of the Compton electrons in the scintillating material is greater than the width $d_{SZ}$ of the region, this results in a critical angle $\alpha_{gr}$ from which the maximum energy Emax will no longer be deposited in a single scintillator segment:

$$E_{dep}(\alpha \geq \alpha_{gr}) < E_{dep,max}.$$ (Equation 2)

If the widths $d_{SZ}$, $dN_{SZ}$ of the scintillating and non-scintillating regions are smaller than the respective range, the probability that the energy will be deposited in a plurality of scintillator segments increases as the angle of incidence α increases. An energy deposition in k=2, 3, 4 ... scintillator regions requires that at least a distance $S_{NSZ} \geq k\, d_{NSZ}/\sin\alpha$ has been covered previously in non-scintillating material. The respective deposited energy of an electron thus decreases with the number of scintillator segments or regions passed through by the secondary electrons. Further critical angles, from which an energy deposition in k=2, 3, 4 etc. scintillator segments occurs, may therefore be determined.

If not only the gamma quanta of the Compton edge, but also the direction emissions of the whole spectrum of Compton electrons are considered, then a strong forward scattering of all Compton electrons produced, as shown in FIG. 3A, is found even at moderate gamma energies owing to the law of conservation of momentum. This means that with complete or accurate alignment of the detector element towards the radiation source, even the low energy electrons can deposit their energy completely in the target material or scintillator material. If the detector element is now rotated by an angle relative to the radiation source, then many low energy electrons pass into the absorber material and lose energy there without contributing to the detector signal. Overall, this means that in the detector spectrum, high energy signals are lost and the whole spectrum is shifted towards lower energies.

Because the secondary electrons thus pass diagonally through the layers or plates of the first and second regions, this results in a maximum path length per layer of, for example, $S_{SZ} = d_{SZ}/\sin\alpha$. Because the electrons may be produced at any point in the plates, this means that the path for the energy release of the electrons is limited and the electrons may release only part of their energy in the respective detector material. The remaining energy is released in the adjacent absorber material. Thus, the whole spectrum of the deposited energy is shifted towards lower energies.

Recording energy spectra of this type at different angles of incidence with a movable detector or with a plurality of detectors which are arranged at different angles relative to one another produces spectra with the greatest high energy proportions when the preferred direction or the front face of the detector element is directed frontally towards the gamma source.

The alignment of the incident radiation relative to the preferred direction of the detector element used may take place by recording spectra of the energy deposited in the detector by the secondary electrons. For this purpose, spectra are recorded and analysed for various angles of rotation β of the detector element. In the process, the spectrum recorded at a respective angle of rotation is divided into a plurality of energy ranges and the respective energy deposited therein is measured. These energies may, as is described below, be considered as integrals over the intensity, or individual channel numbers of the corresponding intensity histogram may also be used. Because, with a frontal incidence of the gamma quanta on the detector element, even the scattered secondary electrons move in the gamma direction and deposit energy in only one of the detector layers, the high energy proportion in the spectrum is then greatest. In the simplest case, two energy ranges, a higher and a lower, for example in the vicinity of the Compton edge, are sufficient for estimating the high energy proportion.

The detector element is thus set at an angle of rotation in such a way that the high energy proportion is at a maximum, and the low energy proportion in the associated spectrum is at a minimum by comparison with the other angles of rotation. The preferred direction, or the front face in the case of a detector constructed in a layered manner as shown in FIG. 5, 6 or 8, then points in the direction of the radiation source.

In order to determine the direction of the radiation incident on a detector element according to the invention, in an alternative possible method for the detector according to the invention, a suitable direction parameter r is determined and depends on the ratio of two integrals in the recorded spectrum.

$$r = I_1/I_2 \qquad \text{(Equation 3)}$$

Figure 10:
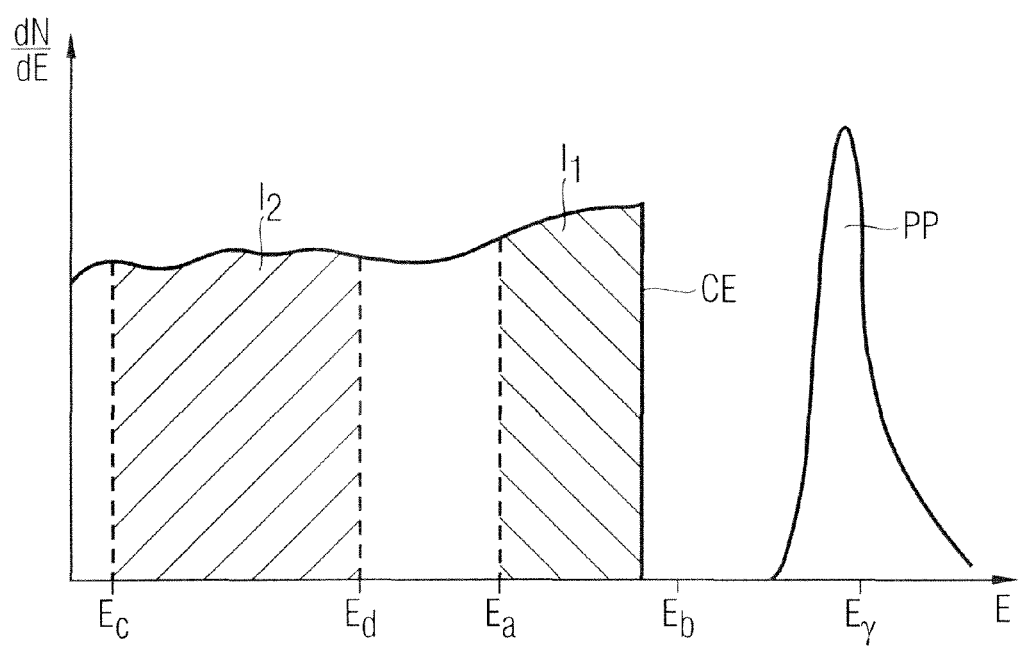
FIG. 10 shows a division according to the invention of a recorded intensity spectrum.

Here, $I_1$ represents an integral for example in the vicinity of the Compton edge and $I_2$ represents an integral over a low energy range in the Compton continuum at a sufficient distance from the Compton edge CC. The integral I1 in this case therefore covers a low energy range, and the integral $I_2$ covers a high energy range. FIG. 10 illustrates possible integration limits for the integrals $$I_1 = \int_{E_a}^{E_b} \frac{dN(E)}{d(E)} dE \qquad \text{(Equation 4)}$$

and $$I_2 = \int_{E_c}^{E_d} \frac{dN(E)}{d(E)} dE.$$

in which the integration limits $E_a$ and $E_b$ cover an energy range in which the Compton edge is expected to lie, and $E_c$ and $E_d$, as noted previously, delimit a range in the Compton continuum.

The selection of the integration limits $E_a$, $E_b$, $E_c$, $E_d$ in this case preferably depends on the energy resolution $R(E)=\Delta E/E$ of the detector. $\Delta E$ in this case corresponds to the half-width of a photo peak formed by monoenergetic photons. The following applies for the distance of the intervals, i.e. the distance between $E_a$ and $E_d$, with an energy-dependent resolution $R(E)=\Delta E/E$:

$$E_a - E_d > R(E_a) \cdot E_a \text{ and } E_a - E_d > R(E_d) \cdot E_d. \qquad \text{(Equation 5)}$$

The respective angle of incidence may be determined from the direction parameter r. For a frontal incidence or at a low angle of incidence α of the radiation to be detected, the integral $I_1$ is predominant, whilst the direction parameter r decreases as the angle of incidence α increases. By turning or rotating the detector element, a maximum value for the direction parameter r may therefore be achieved, and the direction of the corresponding radiation source relative to the preferred plane of the detector element may thus be determined. In a layered arrangement of scintillating and non-scintillating material, as is shown by way of example in FIGS. 5, 6 and 8, a preferred plane parallel to the layers is obtained.

With a combination of two detector elements which use bearing resolution and are made of layers, the preferred planes of the detector elements being mounted perpendicular to one another, directional resolution may be achieved by means of the intersecting preferred planes of the two detector elements. FIG. 11 shows examples of possible alternative arrangements of regions with scintillating detector material and non-scintillating detector material. The shaded regions in this figure indicate regions with scintillator material or active detector material.

Figure 11A:
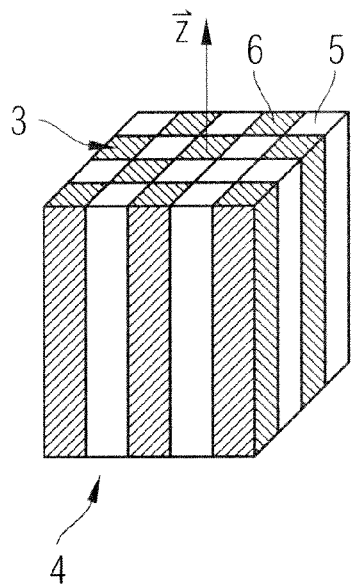
FIG. 11 shows various geometric embodiments of the detector element.
Figure 11B:
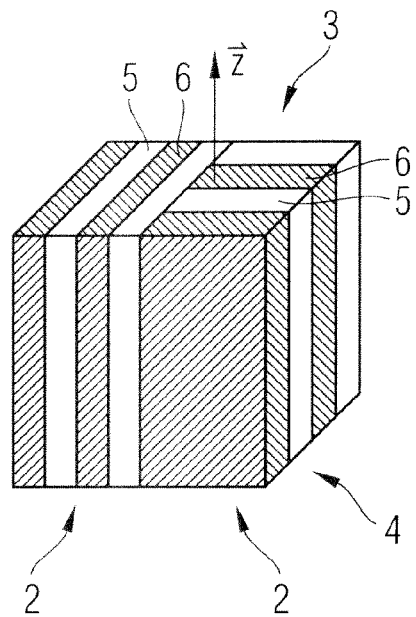
Figure 11C:
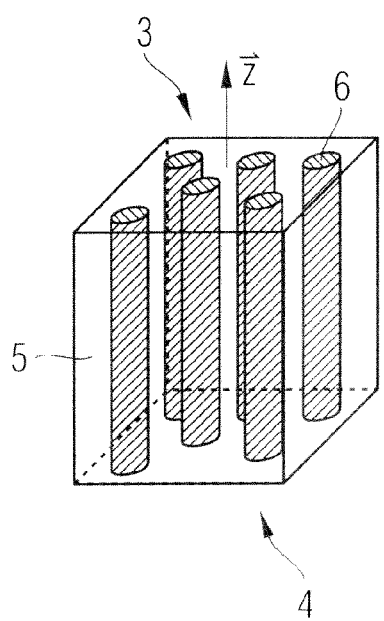
Figure 11D:
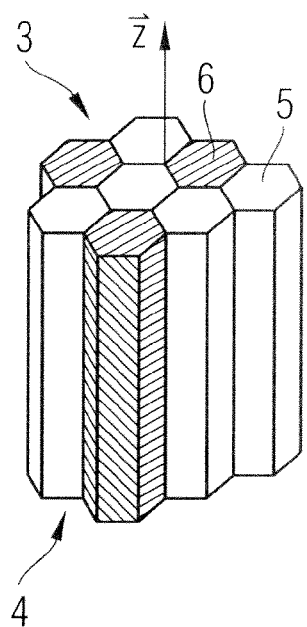
Figure 11E:
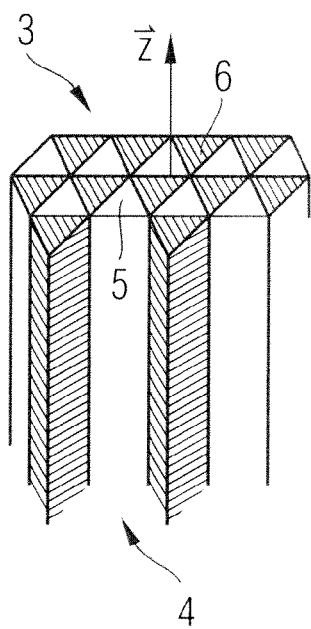

By way of example, FIG. 11b shows two detector elements 2, which are oriented perpendicular to one another. Naturally, it is also possible to construct the regions of scintillating and non-scintillating detector material as polyhedra. By way of example, FIG. 11a shows a block of polyhedra with substantially square bases, segments of absorber material or non-scintillating material 5 and scintillating material 6 being arranged in a chequered manner. FIGS. 11d and 11e show detector elements which are likewise constructed from polyhedra, with a hexagonal base in FIG. 11d and with a triangular base in FIG. 11e. The arrangement of cylindrical regions of scintillating material, of which the axes of symmetry are arranged so as to be parallel, and which are surrounded by a non-scintillating material, as is shown in FIG. 11c, is also conceivable. In FIG. 11, the preferred direction is shown in each case by a vector $\overline{Z}$.

As an alternative to regions with scintillating material and absorber or non-scintillating material, semiconductor materials, which work as semiconductor detectors, may also be used for the scintillating materials. Signals which specify the respective deposited energy may then be read directly from these respective active regions.

In a correspondingly altered configuration of the detector assembly according to the invention, the first and second regions comprise active detector material, the two regions each being able to be read separately. The material of the first regions then acts as an absorber for the material of the second regions and vice versa. This case may also be thought of as two interleaved detector elements, the active layers (regions with active detector material) of the two detector elements being slid into one another and engaging with one another like teeth. The layer thicknesses in this case may be equal or different for the two materials. Chemically similar or different material compositions are also possible.

Figure 12:
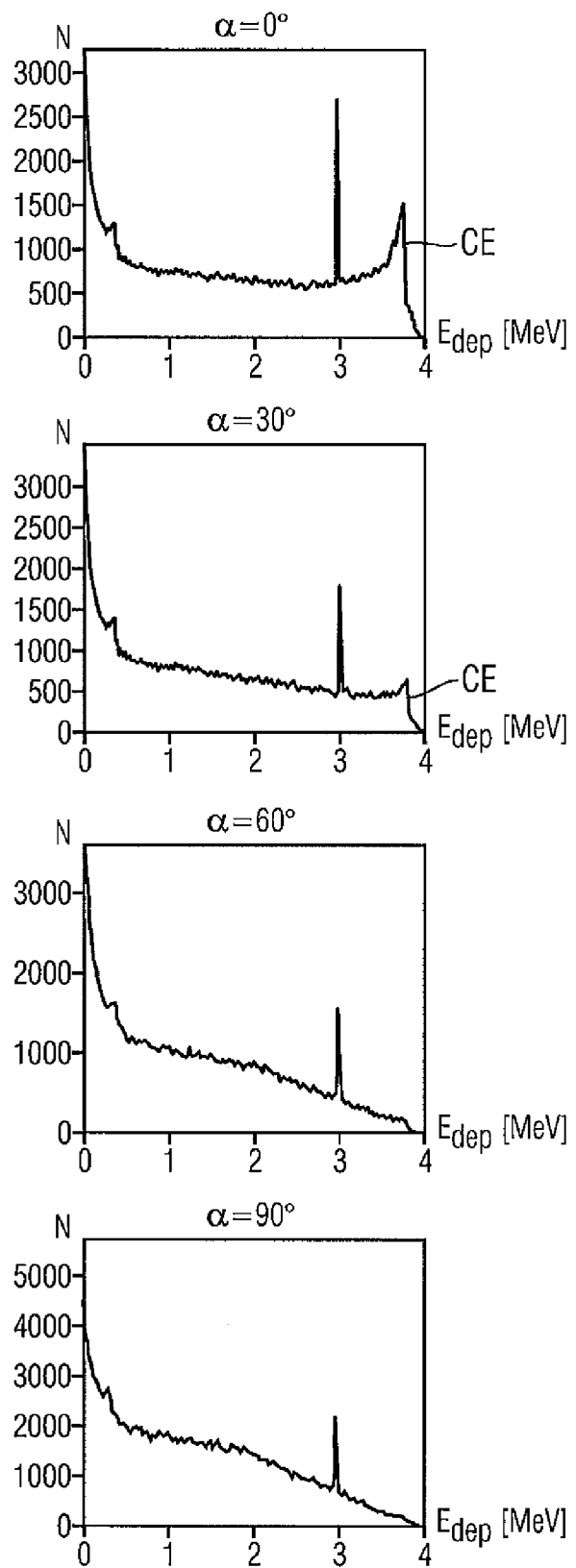
FIG. 12, 13 show simulations of recorded spectra from a detector assembly according to the invention.
Figure 13:
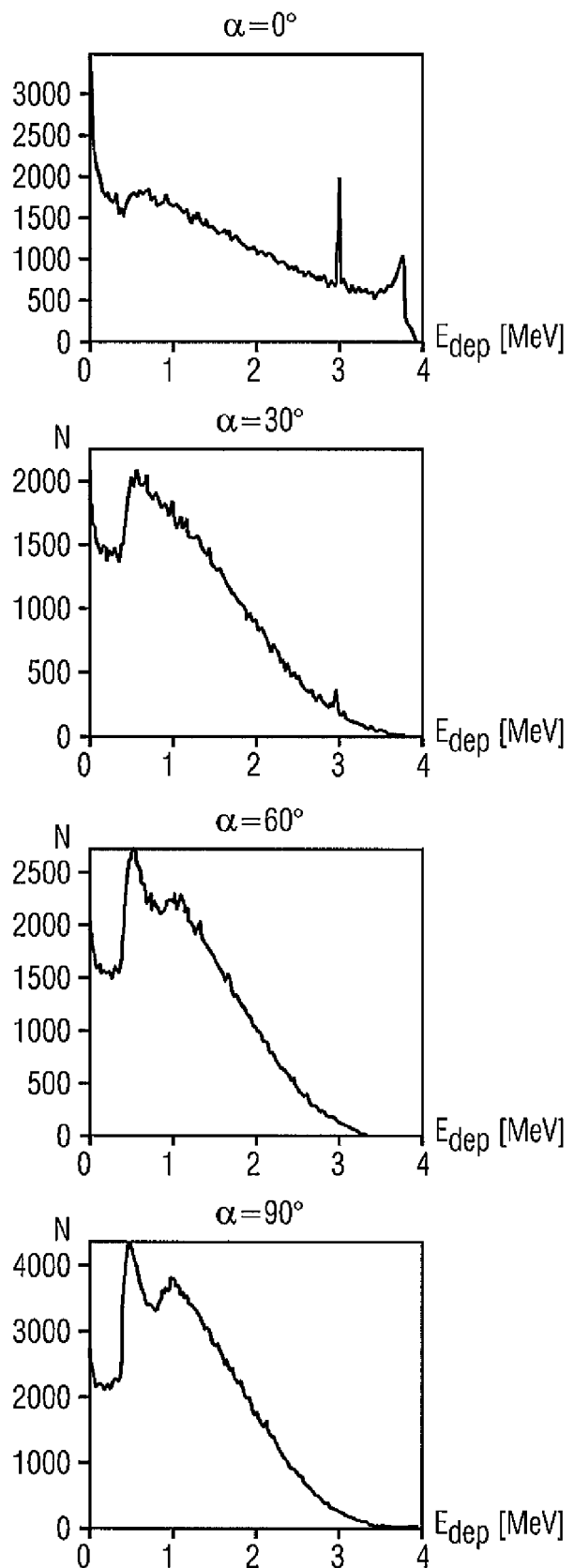

FIGS. 12 and 13 show simulation results by the applicant for a detector element constructed in layers according to the invention, for different layer thicknesses $d_{SZ}$, $dN_{SZ}$ and angles of incidence α of the gamma radiation. In this case, monoenergetic photon beams with a photon energy of 4 MeV are assumed. The simulated detector element substantially corresponds to the embodiment shown in FIG. 5, a stack of square plates of dimension 44×44 mm² of an organic scintillator polyvinyltoluene being assumed in each case for the regions comprising scintillator material, and iron being taken as the absorber material.

FIG. 12 thus shows spectra of energy deposited in the respective scintillator material for six plate pairs with thickness $d_{SZ}$=9.5 mm for the segments of scintillating material and a thickness of $d_{FE}$=1.6 mm for the iron plates. FIG. 13 shows spectra for a detector element assembled from 24 plate pairs, in which $d_{SZ}$=2.4 mm and $d_{FE}$=0.4 mm. A detector element according to the invention therefore only has a low volume of approximately 67×44×44 mm³ and thus is easy to operate and has numerous applications.

A thickness of ρSZ=1.032 g/cm³ and a stoichiometric composition of C10H11 are assumed for the scintillator material polyvinyltoluene. A thickness of $ρ_{FE}$=7.874 g/cm3 is assumed for the iron. The energy resolution of the detector element is taken as R=0. FIGS. 12 and 13 show histograms or distributions of events in the detector element, evidencing a total of 106 photons. The respective cross-section of the detector element was irradiated evenly in this case.

In the configuration of FIG. 12, i.e. with six plate pairs, a Compton edge CE can be recognised clearly at angles of incidence of α=0° and α=30°. As the angle of incidence α increases, the proportion of high energy events in the spectrum decreases. A greater directional dependency of the shape of the recorded spectrum can be seen in FIG. 13 in the configuration with 24 plate pairs. With 24 plate pairs, and therefore also a relatively low plate thickness, the critical angle αgr at which the spectral form substantially changes is lower than in the configuration according to FIG. 12. The peaks occurring at approximately 3 MeV correspond to double escape peaks of pair production and occur 1.022 MeV below the gamma energy.

The corresponding detector assembly therefore allows "colour information", which is used for an elemental analysis of the material being analysed, to be determined (as explained previously with reference to FIG. 1-4) in addition to the directional information. The layered embodiment of the detector element according to the invention results in a colour shift, leading to smaller signals in the case of non-frontal gamma irradiation. This is particularly advantageous in the case of nitrogen detection. Because the high energy proportions are predominant for nitrogen lines, the nitrogen signal in the measured spectrum stands out particularly clearly from the remaining elements when the preferred direction of the detector is pointing towards the object being searched for or the material sample.

Figure 14:
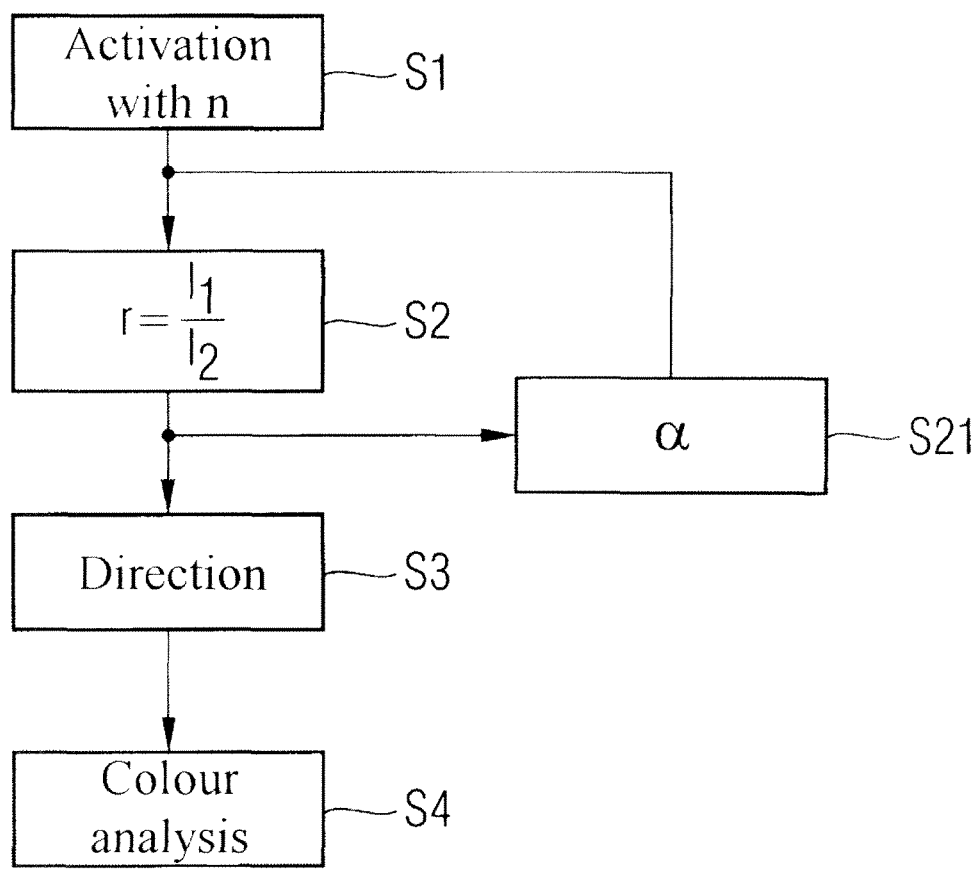
FIG. 14 shows a second sequence of method steps according to the invention.

Using the method according to the invention and the detector assembly for the detection of landmines involves the following method steps, shown in FIG. 14. In a first step S1, the material to be analysed, for example a region of ground, is irradiated with neutrons by means of a neutron source, and this leads to nuclear reactions in the material. At a set angle of the preferred direction of the detector element relative to the ground region to be analysed, the energy deposited in the scintillator material is recorded and a direction parameter is determined in step S2 in accordance with equations 4 and 6. This is achieved by rotating the detector element at a plurality of altered angles of incidence $\alpha$ or angles of rotation (step S21). A maximum of the direction parameter r generally indicates that the preferred axis or direction of the detector element is pointing towards the radiation source. A direction is initially recognised in this way (step S3). Alternatively, in steps S2 and S21, the respective high and low energy portions of the spectra are detected at various angles of rotation. A preferred angle of rotation, at which the high energy portion of the associated spectrum exhibits a maximum based on the spectra recorded at the other angles of rotation, provides the direction of the radiation source in relation to the detector element.

Subsequently, a colour analysis is performed in step S4, i.e. at least three energy ranges are selected, and the deposited energy present therein in the scintillator material of the detector element is calculated as colour parameters F1, F2, F3. From these three obtained colour parameters F1, F2, F3, the presence of nitrogen-containing materials, in particular explosives, may be recognised for example by comparison with known colour parameter combinations.

The same sequence of method steps is provided in the analysis of luggage or cargo.

Deuterium-tritium generators or radioactive systems are possible neutron sources. Neutron generators make use of a reaction of $t(d, n)$ $^4$He, which substantially produces an isotropic distribution of neutrons of energy 14.4 MeV. However, voltages of 300 kV, which require a relatively large generator, are required for accelerating the deuterons.

Possibilities for compact neutron sources with relatively low source strength include neutron emitters such as $^{252}$Cf with a half-life of 2.6 years and a neutron energy of a few MeV. It is also possible to use americium-beryllium preparations, which are mixed in a powdered form in order to increase the yield of Am and Be. Preparations of this form also provide an even, isotropic distribution of the neutron flow. However, heavy absorbers are required for shielding when transporting a neutron source of this type.

For this reason, for transportable use when searching for mines, a neutron source which can be switched off may be used, the alpha source such as $^{241}$Am and the beryllium target remaining separated. In the case of an alpha source formed with a large surface as a foil, a beryllium target is present a short distance away. Alpha particles which hit the beryllium target produce a wide neutron spectrum around 2.5 MeV upon doing so, primarily in the forward direction. By increasing the distance between the alpha emitter and the beryllium target, or by introducing an absorber, it is possible to halt neutron production. This also allows safe transport without expensive neutron shielding.

Figure 15:
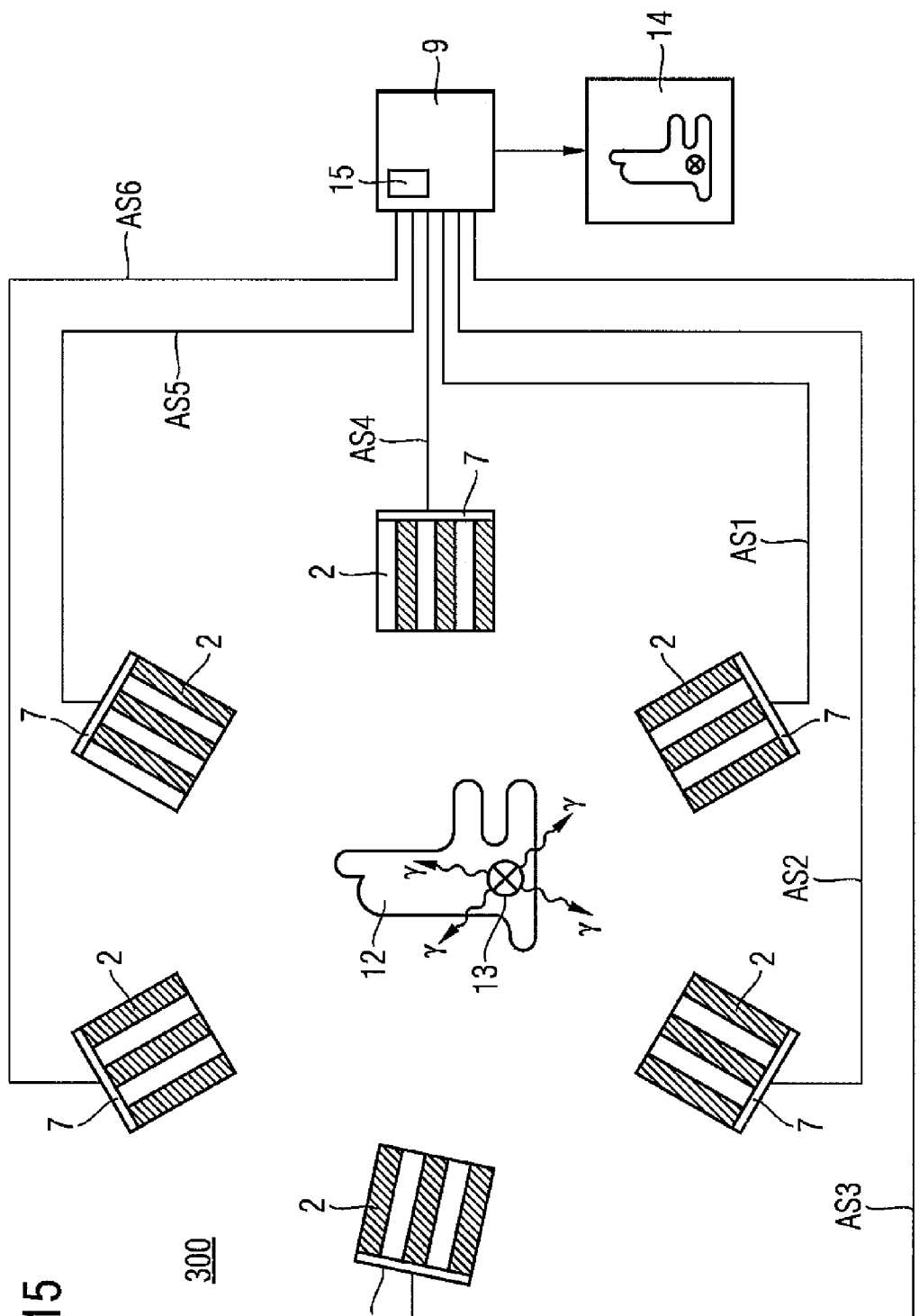
FIG. 15 shows a third embodiment of the detector assembly according to the invention.

A detector assembly according to the invention can also be used for tomographic applications. FIG. 15 shows a detector assembly 300 according to the invention, in which a plurality of detector elements 2 according to the invention are provided and are arranged about a material sample 12. The material sample 12 may for example be a piece of luggage or cargo which comprises a localised quantity of gamma-emitting material. The gamma-emitting material, as the gamma radiation source 13, may be produced for example by activating a capsule of explosives with neutrons.

The respective detector elements of the associated photomultiplier 7 each provide evaluation signals AS1-AS6 to an electronic evaluation means 9. From the various direction data which can be obtained in accordance with the method according to the invention, the position of the gamma radiation source 13 may be determined precisely. A display device 14 which is coupled to the evaluation means 9 may for example provide an image of the gamma source which is contained in the material sample 12.

When evaluating the direction data, which indicate at least one angle between the respective preferred direction of the detector element 2 and the radiation source 13, images may be produced and displayed with conventional imaging methods. The material composition is also determined, by establishing the colour parameters and comparing with known "colour profiles", which can be saved in a storage means 15. The method according to the invention and the detector assembly may thus be put to excellent use in material analysis.

Figure 16:
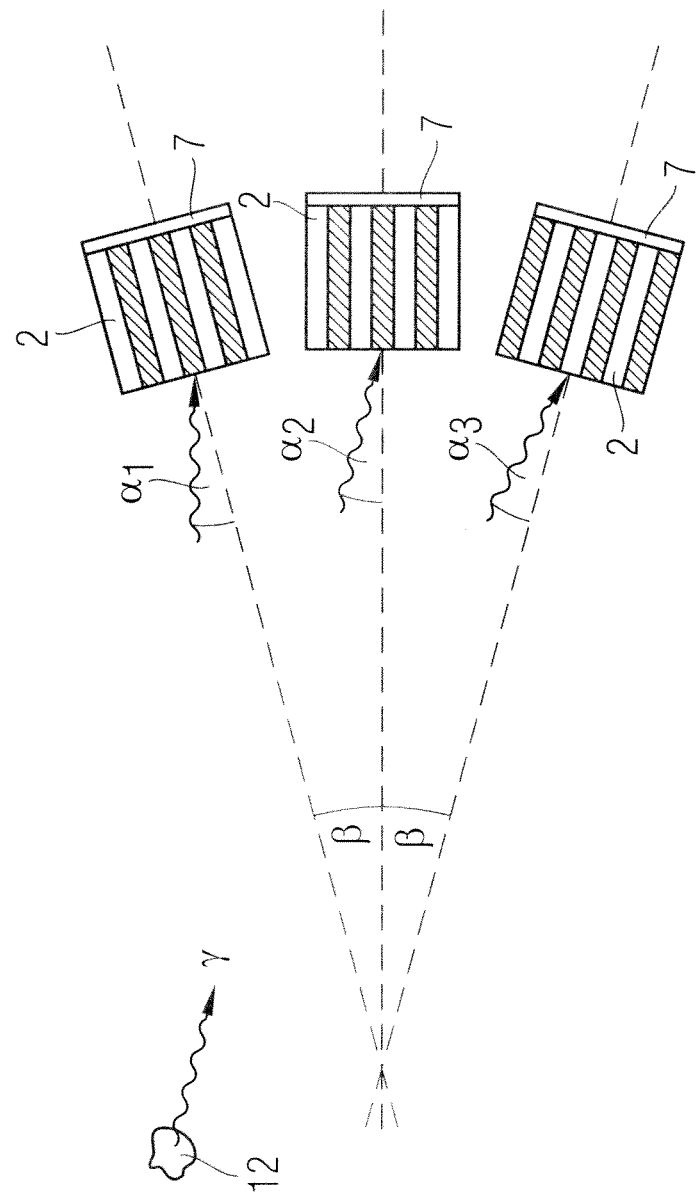
FIG. 16 shows a fourth embodiment of the detector assembly according to the invention.

FIG. 16 shows a fourth embodiment of the detector assembly, in which a plurality of detector elements 2 are arranged so as each to be turned through an angle $\beta$ which is equivalent to an angle of rotation. Each detector element 2 records spectra of the Compton electrons in the active detector material via the respective photomultiplier 7. Based on a gamma source 12, a respective angle of incidence $\alpha_1, \alpha_2, \alpha_3$ is obtained for each detector element 2 relative to the preferred direction thereof, which is indicated by the dashed line. By comparing the energies deposited in the detector material which are recorded at different angles $\beta$ in the predetermined energy ranges, the direction from which the maximum high energy intensity is coming may be determined. For example, the energies deposited in a first low energy range are measured in the three detector elements and compared with one another. A similar comparison of the deposited energies in a second, higher energy range then takes place. The gamma radiation source is then assumed to be in the preferred direction of the detector element for which the high energy portion in the recorded spectrum is shifted towards lower energies by the smallest amount.

The invention thus allows on the one hand the determination of a material sample composition, and on the other hand a direction-dependent detection of high energy photons, the collimation taking place in the respective detector material. By avoiding passive absorber layers, a higher efficiency is achieved than with external collimation by means of collimation holes. The construction of a collimator for the incident gamma quanta in front of the actual detector with active detector materials is thus not required. According to the invention, no collimator of any sort, which would decrease the transmission of the detector assembly, is provided for the detector element. A fixed collimator could also only be optimised for a particular energy range, whilst the construction according to the invention may be applied flexibly. Instead of a conventional collimation of the incident gamma quanta, the electrons produced in the detector materials, for example by and/or pair production, are collimated within the detector. The electrons produced by the incident photons may also therefore be decelerated more easily, i.e. over a shorter distance, in the respective detector material (solid body). Because no coincidence measurements are required, simpler signal processing is also possible. In combination with a neutron source for excitation, in particular of nitrogen-containing explosives, it is possible for example to detect land mines or to analyse luggage and cargo.

The determination according to the invention, in a manner similar to colour analysis, of an elemental composition of the material sample is also possible in a simple manner.

The detector elements may be produced using simple, standardised components. The small embodiment, in particular of the detector elements without external collimation means, allows for use as a portable means and allows the detection space to be equipped with detector elements according to the invention in imaging applications.

Figure 17:
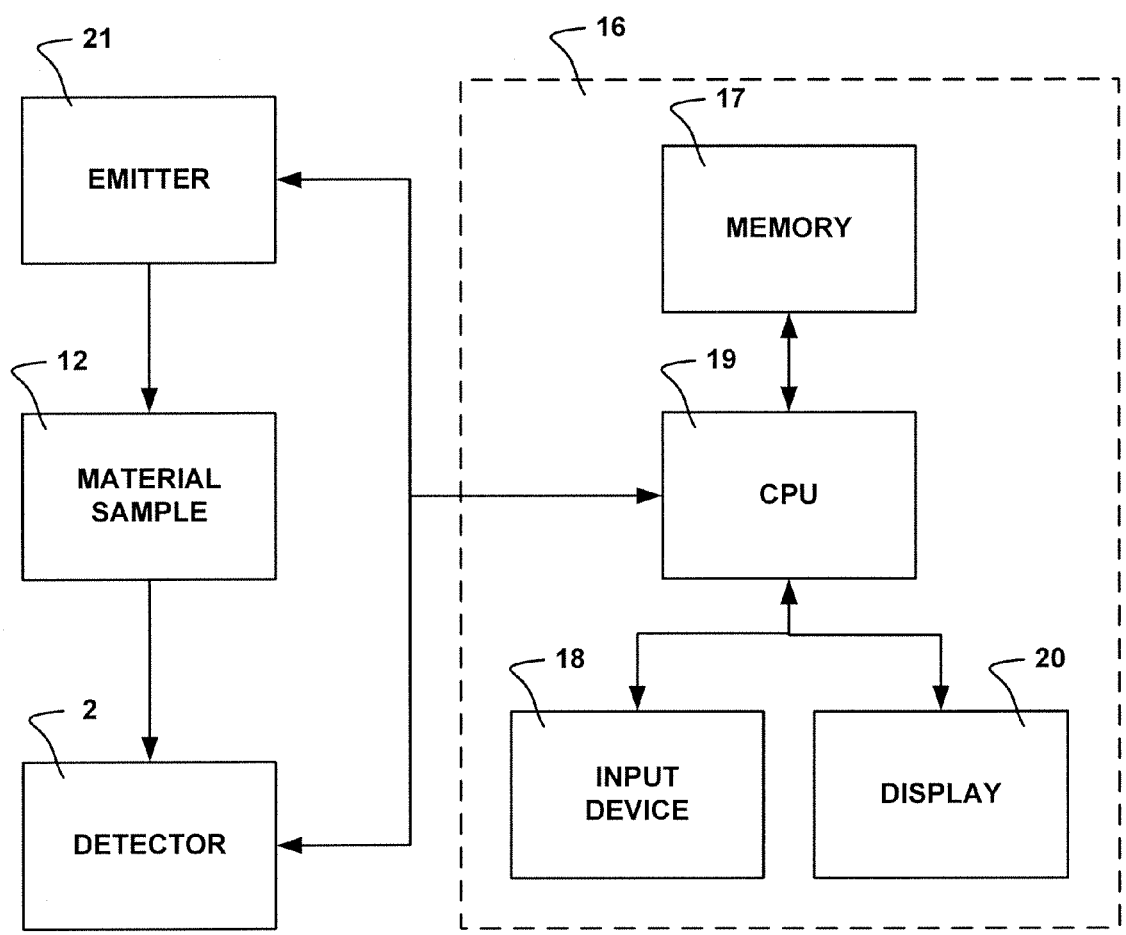
FIG. 17 shows a schematic block diagram of an exemplary apparatus that is capable of implementing one or more aspects of the present invention disclosed herein.

FIG. 17 shows a schematic block diagram of an exemplary apparatus that is capable of implementing one or more aspects of the present invention. A processing device 16, such as a personal computer (PC), may be used to perform the steps of determining the material composition of a sample. The processing device 16 may include memory 17, input devices 18, a central processing unit 19 and a display 20. The memory 17 may be any of a variety of storage devises such as Random Access Memory (RAM) and/or Read-only Memory (ROM). The input devices 18 may include a keyboard, mouse, or joystick with which a user may use to input commands to the CPU 19. The CPU 19 may be configured to read and write data to the memory 17, accept input commands from the input devices 18, and display the results on display 20. The CPU 19 may also interface with an emitter 21, and a detector 2 providing input steps, performing calculations, and/or formatting data on irradiated material sample 12 according to the steps previously described. The emitter 21 may be any radiation emitting device such as, for example, the previously described neutron source 11.

Although the present invention is explained in detail by way of preferred embodiments, it is not limited to these but may be modified in numerous ways. In particular, the layer arrangements described in detail may be changed. The penetration of a plurality of detector materials in the case of trajectories of incident gamma radiation with different angles relative to the preferred direction of the detector elements is essential. This preferred direction is obtained by the respective geometry of the different detector regions of active detector material and absorbing detector material. Modifications besides the geometries shown in the figures are of course possible in this case. Also, other devices than the light measurement means or the photomultiplier, given by way of example, are conceivable for reading the active detector materials.

The absolute energy ranges specified in the description may also be changed without fundamentally altering the trajectories and energy depositions of the Compton electrons.

It is further possible to provide more than three energy ranges and to define corresponding further colour parameters. This would produce a "multidimensional colour space", in which particular regions are assigned to known material compositions or elements in the material sample. The individual energy regions may also overlap.

Naturally, the invention may be used in numerous ways besides the examples mentioned for mine detection and luggage control or tomographic applications.

LIST OF REFERENCE NUMERALS 1 detector assembly
2 detector element
3 front face
4 rear face
5 first region
6 second region
7 photomultiplier
8 photocathode
9 evaluation means
10 display means
11 neutron source
12 material sample
13 gamma radiation source
14 display means
15 storage means
16 processing device
17 memory
18 input device
19 central processing unit
20 display
21 emitter
AS1-AS6 evaluation signals
γ gamma radiation
S1-S4, S21 method steps
CE Compton edge
F1, F2, F3 colour parameters
α angle of incidence
Z direction vector
PP photo peak
$S_{SZ}$ path length in the scintillator
$S_{NZ}$ path length in the absorber
T1-T6 trajectory
$R_{CSDA}$ range according to continuous slowing down approximation
$d_{NSZ}$, $d_{SZ}$ thickness
$α_{gr}$ critical angle

We claim:

1. A method for determining the presence of a material composition in a material sample, said material sample emitting radiation, comprising:
   recording a spectrum of the energy deposited in a detector material by the emitted radiation;
   determining a first deposited energy as an integral of the recorded energy deposited over a first energy range extending from a first energy to a second energy, determining a second deposited energy as an integral of the recorded energy deposited over a second energy range extending from the second energy to a third energy, and determining a third deposited energy as an integral of the recorded energy deposited over a third energy range;
   assigning a first colour parameter to the first deposited energy, a second colour parameter to the second deposited energy, and a third colour parameter to the third deposited energy;
   determining a colour vector from the first colour parameter, the second colour parameter and the third colour parameter; and
   comparing the colour vector with a volume in a three-dimensional colour parameter space associated with a predetermined material composition so as to determine if the material sample includes the predetermined material composition.

2. The method according to claim 1, further comprising:
determining energies deposited in further energy ranges, and
assigning further colour parameters to said further energies.

3. The method according to claim 1, wherein exactly three deposited energies and exactly three colour parameters are detected.

4. The method according to claim 1, further comprising:
detecting the emitted radiation with a detector element, said detector element comprising a detector material, and
selecting a distance between said energy ranges as a function of an energy resolution of said detector element.

5. The method according to claim 4, wherein recording the spectrum comprises measuring a distribution of events in which energy is deposited in the detector material as a function of the energy deposited.

6. The method according to claim 1, further comprising: irradiating neutrons on the material sample to activate the material sample.

7. The method according to claim 1, further comprising:
detecting the emitted radiation with an angular resolution with a detector assembly, said detector assembly comprising at least one detector element having a front face and a rear face, wherein:
a space between the front face and the rear face of the detector element is Filled with a plurality of regions of a first detector material and at least one region of a second detector material, and each region connects the front face to the rear face of the detector element; and
wherein an energy deposition takes place in at least the regions of the first detector material as a function of an angle of incidence of the emitted radiation on the detector element; and
determining a preferred angle of rotation, for which the energy deposited in the first and/or second energy region is a maximum or a minimum.

8. The method according to claim 7, comprising:
determining a direction of a radiation source relative to the detector element as a function of the preferred angle of rotation.

9. The method according to either claim 7, further comprising:
determining a direction parameter as a function of the ratio of the first and second deposited energies.

10. The method according to claim 9, further comprising:
determining the direction parameter r for various detection directions, the respective detection direction being substantially normal to the front face of the detector element.

11. The method according to either claim 9, further comprising:
determining a direction of the radiation source relative to the detector element as a function of the direction parameter r.

12. The method according to claim 7, wherein in which the first and second regions of said at least one detector element comprise active and separately readable detector material, the method further comprising: adding the energies determined for the first, second and third energy ranges and deposited in the first and second detector materials.

13. A detector assembly for the detection of radiation emitted by a material sample, comprising:
at least one detector element comprising an active detector material;
a detection device being coupled to the detector element and receiving signals from the detector element; and
an evaluation device which detects a distribution of energies deposited in the detector material as a function of the signals, said evaluation device being operable to a least perform the steps of:
recording a spectrum of the energy deposited in the active detector material by the emitted radiation;
determining a first deposited energy as an integral of the recorded energy deposited over a first energy range extending from a first energy to a second energy, determining a second deposited energy as an integral of the recorded energy deposited over a second energy range extending from the second energy to a third energy, and determining a third deposited energy as an integral of the recorded energy deposited over a third energy range;
assigning a first colour parameter to the first deposited energy, a second colour parameter to the second deposited energy, and a third colour parameter to the third deposited energy;
determining a colour vector from the first colour parameter, the second colour parameter and the third colour parameter; and
comparing the colour vector with a volume in a three-dimensional colour parameter space associated with a predetermined material composition so as to determine if the material sample includes the predetermined material composition.

14. The detector assembly according to claim 13, wherein the detection device is configured as a light measurement device, which integrally detects scintillation light from the detector material as signals.

15. The detector assembly according to claim 13, wherein the active detector material forms a semiconductor detector, with which electrical signals can be read.

16. The detector assembly according to claim 13, wherein the evaluation device comprises a storage device in which value combinations of colour parameters corresponding to known material compositions are stored.

17. The detector assembly according to claim 13, wherein said at least one detector comprises a front face and a rear face, wherein:
a space between the front face and the rear face of the detector element is filled with a plurality of regions of a first detector material and at least one region of a second detector material, and each region connects the front face to the rear face of the detector element; and
wherein an energy deposition takes place in at least the regions of the first detector material as a function of art angle of incidence of the emitted radiation on the detector element.

18. A method for identifying nitrogen-containing explosives in material samples comprising;
providing a detector assembly with at least one detector element comprising an active detector material, a detection device being coupled to the detector element and receiving signals from the detector element, and an evaluation device which detects a distribution of energies deposited in the detector material as a function of the signals;
recording a spectrum of the energy deposited in the active detector material by the emitted radiation;

determining a first deposited energy as an integral of the recorded energy deposited over a first energy range extending from a first energy to a second energy, determining a second deposited energy as an integral of the recorded energy deposited over a second energy range extending from the second energy to a third energy, and determining a third deposited energy as an integral of the recorded energy deposited over a third energy range;

assigning a first colour parameter to the first deposited energy, a second colour parameter to the second deposited energy, and a third colour parameter to the third deposited energy;

determining a colour vector from the first colour parameter, the second colour parameter and the third colour parameter; and comparing the colour vector with a volume in a three-dimensional colour parameter space associated with a predetermined material composition comprising a nitrogen-containing explosive so as to determine if the material sample includes the predetermined material composition.

19. The method according to claim 18, wherein said material samples are at least one of the group of: a luggage item, a land mine or a cargo.

20. A method for determining the presence of a material composition in a material sample, said material sample emitting radiation, comprising:

recording a spectrum of the energy deposited in a detector material by the emitted radiation;

determining a first energy deposited in a first energy range, a second energy deposited in a second energy range, and a third energy deposited in a third energy range;

assigning a first colour parameter to the first deposited energy, a second colour parameter to the second deposited energy, and a third colour parameter to the third deposited energy; and comparing the assigned colour parameters with predetermined values for the colour parameters corresponding to a predetermined material composition so as to determine the presence of the material composition;

detecting the emitted radiation with an angular resolution with a detector assembly, said detector assembly comprising at least one detector element having a front face and a rear face, wherein:

a space between the front face and the rear face of the detector element is filled with a plurality of regions of a first detector material and at least one region of a second detector material, and each region connects the front face to the rear face of the detector element: and wherein an energy deposition takes place in at least the regions of the first detector material as a function of an angle of incidence of the emitted radiation on the detector element;

determining a preferred angle of rotation, for which the energy deposited in the first and/or second energy region is a maximum or a minimum; and determining a direction parameter as a function of the ratio of the first and second deposited energies.

21. The method according to claim 20, further comprising:

determining the direction parameter r for various detection directions, the respective detection direction being substantially normal to the front face of the detector element.

22. The method according to either claim 20, further comprising:

determining a direction of the radiation source relative to the detector element as a function of the direction parameter r.

* * * * *